United States Patent
Hammad et al.

(10) Patent No.: US 11,783,326 B2
(45) Date of Patent: *Oct. 10, 2023

(54) TRANSACTION AUTHENTICATION USING NETWORK

(71) Applicant: Visa U.S.A. Inc., San Francisco, CA (US)

(72) Inventors: Ayman Hammad, Pleasanton, CA (US); Patrick Faith, Pleasanton, CA (US); Mark Carlson, Half Moon Bay, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,912

(22) Filed: Jul. 28, 2021

(65) Prior Publication Data

US 2021/0357919 A1    Nov. 18, 2021

Related U.S. Application Data

(63) Continuation of application No. 16/123,996, filed on Sep. 6, 2018, now Pat. No. 11,107,069, which is a continuation of application No. 11/764,343, filed on Jun. 18, 2007, now abandoned.

(60) Provisional application No. 60/884,089, filed on Jan. 9, 2007, provisional application No. 60/815,430, filed
(Continued)

(51) Int. Cl.
| | |
|---|---|
| *G06Q 20/38* | (2012.01) |
| *G06Q 20/08* | (2012.01) |
| *G06Q 20/20* | (2012.01) |
| *G06Q 20/36* | (2012.01) |
| *G06Q 20/40* | (2012.01) |
| *G06Q 30/06* | (2023.01) |
| *G06Q 20/10* | (2012.01) |

(52) U.S. Cl.
CPC ......... *G06Q 20/382* (2013.01); *G06Q 20/085* (2013.01); *G06Q 20/20* (2013.01); *G06Q 20/3674* (2013.01); *G06Q 20/385* (2013.01); *G06Q 20/3821* (2013.01); *G06Q 20/3829* (2013.01); *G06Q 20/40* (2013.01); *G06Q 20/401* (2013.01); *G06Q 30/06* (2013.01); *G06Q 20/105* (2013.01); *G06Q 20/204* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 3,956,615 | A | 5/1976 | Anderson et al. |
| 4,186,871 | A | 2/1980 | Anderson et al. |
| 4,238,853 | A | 12/1980 | Ehrsam et al. |

(Continued)

OTHER PUBLICATIONS

"U.S. Appl. No. 10/642,878", Method and System for Generting a Dynamic Verification Value, filed Aug. 18, 2003, 30 pages.
(Continued)

*Primary Examiner* — Eric W Stamber
*Assistant Examiner* — Ashley Y Young
(74) *Attorney, Agent, or Firm* — Kilpatrick Townsend & Stockton LLP

(57) ABSTRACT

Systems and method for improved consumer and portable consumer device authentication are disclosed. Such systems and methods may include using dynamic verification values, challenge questions, and consumer notification as ways to prevent fraudulent transactions from being conducted.

18 Claims, 12 Drawing Sheets

Related U.S. Application Data on Jun. 20, 2006, provisional application No. 60/815,059, filed on Jun. 19, 2006.

(56) References Cited

U.S. PATENT DOCUMENTS

| | | |
|---|---|---|
| 4,277,837 A | 7/1981 | Stuckert |
| 4,317,957 A | 3/1982 | Sendrow |
| 4,423,287 A | 12/1983 | Zeidler |
| 4,528,442 A | 7/1985 | Endo |
| 4,707,592 A | 11/1987 | Ware |
| 4,742,351 A | 5/1988 | Suzuki |
| 4,758,714 A | 7/1988 | Carlson et al. |
| 5,017,766 A | 5/1991 | Tamada et al. |
| 5,163,097 A | 11/1992 | Pegg |
| 5,177,342 A | 1/1993 | Adams |
| 5,254,843 A | 10/1993 | Hynes et al. |
| 5,311,594 A | 5/1994 | Penzias |
| 5,361,062 A | 11/1994 | Weiss et al. |
| 5,365,586 A | 11/1994 | Indeck et al. |
| 5,384,449 A | 1/1995 | Peirce |
| 5,408,505 A | 4/1995 | Indeck et al. |
| 5,420,926 A | 5/1995 | Low et al. |
| 5,428,683 A | 6/1995 | Indeck et al. |
| 5,434,398 A | 7/1995 | Goldberg |
| 5,465,206 A | 11/1995 | Hilt et al. |
| 5,465,387 A | 11/1995 | Mukherjee |
| 5,500,513 A | 3/1996 | Langhans et al. |
| 5,513,250 A | 4/1996 | McAllister |
| 5,526,409 A | 6/1996 | Conrow et al. |
| 5,530,438 A | 6/1996 | Bickham et al. |
| 5,539,810 A | 7/1996 | Kennedy et al. |
| 5,546,462 A | 8/1996 | Indeck et al. |
| 5,577,121 A | 11/1996 | Davis et al. |
| 5,615,110 A | 3/1997 | Wong |
| 5,621,201 A | 4/1997 | Langhans et al. |
| 5,625,689 A | 4/1997 | Indeck et al. |
| 5,655,007 A | 8/1997 | McAllister |
| 5,679,940 A | 10/1997 | Templeton et al. |
| 5,708,422 A | 1/1998 | Blonder et al. |
| 5,721,781 A | 2/1998 | Simon et al. |
| 5,737,421 A | 4/1998 | Audebert |
| 5,740,244 A | 4/1998 | Indeck et al. |
| 5,745,576 A | 4/1998 | Abraham et al. |
| 5,774,525 A | 6/1998 | Kanevsky et al. |
| 5,802,176 A | 9/1998 | Audebert |
| 5,812,668 A | 9/1998 | Weber |
| 5,819,226 A | 10/1998 | Gopinathan et al. |
| 5,832,458 A | 11/1998 | Jones |
| 5,834,747 A | 11/1998 | Cooper |
| 5,835,599 A | 11/1998 | Buer |
| 5,839,119 A | 11/1998 | Krsul et al. |
| 5,872,834 A | 2/1999 | Teitelbaum |
| 5,878,337 A | 3/1999 | Joao et al. |
| 5,883,810 A | 3/1999 | Franklin et al. |
| 5,903,830 A | 5/1999 | Joao et al. |
| 5,914,471 A | 6/1999 | Van De |
| 5,914,472 A | 6/1999 | Foladare et al. |
| 5,920,628 A | 7/1999 | Indeck et al. |
| 5,953,710 A | 9/1999 | Fleming |
| 5,956,699 A | 9/1999 | Wong et al. |
| 5,988,497 A | 11/1999 | Wallace |
| 5,988,500 A | 11/1999 | Litman |
| 5,991,410 A | 11/1999 | Albert et al. |
| 6,000,832 A | 12/1999 | Franklin et al. |
| 6,005,942 A | 12/1999 | Chan et al. |
| 6,012,144 A | 1/2000 | Pickett |
| 6,016,476 A | 1/2000 | Maes et al. |
| 6,029,154 A | 2/2000 | Pettitt |
| 6,052,675 A | 4/2000 | Checchio |
| 6,053,406 A | 4/2000 | Litman |
| 6,055,505 A | 4/2000 | Elston |
| 6,064,990 A | 5/2000 | Goldsmith |
| 6,067,529 A | 5/2000 | Ray et al. |
| 6,081,792 A | 6/2000 | Cucinotta et al. |
| 6,094,643 A | 7/2000 | Anderson et al. |
| 6,095,413 A | 8/2000 | Tetro et al. |
| 6,105,006 A | 8/2000 | Davis et al. |
| 6,112,191 A | 8/2000 | Burke |
| 6,122,624 A | 9/2000 | Tetro et al. |
| 6,157,707 A | 12/2000 | Baulier et al. |
| 6,182,894 B1 | 2/2001 | Hackett et al. |
| 6,184,651 B1 | 2/2001 | Fernandez et al. |
| 6,219,793 B1 | 4/2001 | Li et al. |
| 6,226,624 B1 | 5/2001 | Watson et al. |
| 6,234,901 B1 | 5/2001 | Nagoshi et al. |
| 6,254,002 B1 | 7/2001 | Litman |
| 6,260,146 B1 | 7/2001 | Mos et al. |
| 6,263,447 B1 | 7/2001 | French et al. |
| 6,282,522 B1 | 8/2001 | Davis et al. |
| 6,282,656 B1 | 8/2001 | Wang |
| 6,298,336 B1 | 10/2001 | Davis et al. |
| 6,308,890 B1 | 10/2001 | Cooper |
| 6,327,578 B1 | 12/2001 | Linehan |
| 6,330,550 B1 | 12/2001 | Brisebois et al. |
| 6,339,766 B1 | 1/2002 | Gephart |
| 6,345,101 B1 | 2/2002 | Shukla |
| 6,367,011 B1 | 4/2002 | Lee et al. |
| 6,381,584 B1 | 4/2002 | Ogram |
| 6,442,532 B1 | 8/2002 | Kawan |
| 6,456,984 B1 | 9/2002 | Demoff et al. |
| 6,466,126 B2 | 10/2002 | Collins et al. |
| 6,488,206 B1 | 12/2002 | Flaig et al. |
| 6,496,936 B1 | 12/2002 | French et al. |
| 6,505,046 B1 | 1/2003 | Baker |
| 6,523,745 B1 | 2/2003 | Tamori |
| 6,529,725 B1 | 3/2003 | Joao et al. |
| 6,535,855 B1 | 3/2003 | Cahill et al. |
| 6,560,581 B1 | 5/2003 | Fox et al. |
| 6,592,044 B1 | 7/2003 | Wong et al. |
| 6,607,136 B1 | 8/2003 | Atsmon et al. |
| 6,612,488 B2 | 9/2003 | Suzuki |
| 6,616,035 B2 | 9/2003 | Ehrensvard et al. |
| 6,636,833 B1 | 10/2003 | Flitcroft et al. |
| 6,647,269 B2 | 11/2003 | Hendrey et al. |
| 6,651,885 B1 | 11/2003 | Arias |
| 6,684,250 B2 | 1/2004 | Anderson et al. |
| 6,714,918 B2 | 3/2004 | Hillmer et al. |
| 6,715,672 B1 | 4/2004 | Tetro et al. |
| RE38,572 E | 8/2004 | Tetro et al. |
| 6,775,539 B2 | 8/2004 | Deshpande |
| 6,816,058 B2 | 11/2004 | McGregor et al. |
| 6,823,721 B1 | 11/2004 | Hilpert et al. |
| 6,830,183 B2 | 12/2004 | Von Mueller et al. |
| 6,832,721 B2 | 12/2004 | Fujii |
| 6,836,670 B2 | 12/2004 | Castrogiovanni et al. |
| 6,837,425 B2 | 1/2005 | Gauthier et al. |
| 6,839,840 B1 | 1/2005 | Cooreman et al. |
| 6,839,845 B2 | 1/2005 | Hsu et al. |
| 6,850,916 B1 | 2/2005 | Wang |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,883,717 B1 | 4/2005 | Kelley et al. |
| 6,899,269 B1 | 5/2005 | Deland |
| 6,904,526 B1 | 6/2005 | Hongwei |
| 6,913,194 B2 | 7/2005 | Suzuki |
| 6,944,782 B2 | 9/2005 | Von Mueller et al. |
| 6,948,656 B2 | 9/2005 | Williams |
| 6,968,180 B2 | 11/2005 | Kirby et al. |
| 6,980,660 B1 | 12/2005 | Hind et al. |
| 6,983,882 B2 | 1/2006 | Cassone |
| 7,003,495 B1 | 2/2006 | Burger et al. |
| 7,003,497 B2 | 2/2006 | Maes |
| 7,007,840 B2 | 3/2006 | Davis |
| 7,013,293 B1 | 3/2006 | Kipnis et al. |
| 7,024,396 B2 | 4/2006 | Woodward |
| 7,044,394 B2 | 5/2006 | Brown |
| 7,051,002 B2 | 5/2006 | Keresman, III et al. |
| 7,058,611 B2 | 6/2006 | Kranzley et al. |
| 7,058,978 B2 | 6/2006 | Feuerstein et al. |
| 7,080,035 B1 | 7/2006 | Williams et al. |
| 7,096,003 B2 | 8/2006 | Joao et al. |
| 7,107,250 B2 | 9/2006 | Harrison |

(56) References Cited

U.S. PATENT DOCUMENTS

| | | |
|---|---|---|
| 7,137,551 B1 | 11/2006 | Crews et al. |
| 7,143,095 B2 | 11/2006 | Barrett et al. |
| 7,152,788 B2 | 12/2006 | Williams |
| 7,160,189 B2 | 1/2007 | Walker et al. |
| 7,225,156 B2 | 5/2007 | Fisher et al. |
| 7,231,657 B2 | 6/2007 | Honarvar et al. |
| 7,243,853 B1 | 7/2007 | Levy et al. |
| 7,248,017 B2 | 7/2007 | Cheng et al. |
| 7,249,093 B1 | 7/2007 | King |
| 7,251,624 B1 | 7/2007 | Lee et al. |
| 7,257,545 B1 | 8/2007 | Hung |
| 7,264,154 B2 | 9/2007 | Harris |
| 7,272,728 B2 | 9/2007 | Pierson et al. |
| 7,273,168 B2 | 9/2007 | Linlor |
| 7,328,850 B2 | 2/2008 | Sines |
| 7,330,871 B2 | 2/2008 | Barber |
| 7,343,149 B2 | 3/2008 | Benco et al. |
| 7,343,317 B2 | 3/2008 | Jokinen et al. |
| 7,349,668 B2 | 3/2008 | Ilan et al. |
| 7,357,310 B2 | 4/2008 | Calabrese et al. |
| D568,388 S | 5/2008 | Hammad |
| D568,389 S | 5/2008 | Hammad |
| D568,390 S | 5/2008 | Law et al. |
| 7,373,669 B2 | 5/2008 | Eisen |
| 7,377,433 B2 | 5/2008 | Morley et al. |
| D571,399 S | 6/2008 | Hammad et al. |
| D571,856 S | 6/2008 | Hammad et al. |
| 7,389,275 B2 | 6/2008 | Kemper et al. |
| D572,752 S | 7/2008 | Hammad |
| D573,181 S | 7/2008 | Hammad |
| 7,401,049 B2 | 7/2008 | Hobbs et al. |
| 7,403,908 B1 | 7/2008 | Jaramillo et al. |
| D575,815 S | 8/2008 | Hammad et al. |
| D576,207 S | 9/2008 | Hammad et al. |
| 7,420,474 B1 | 9/2008 | Elks et al. |
| 7,427,021 B2 | 9/2008 | Kemper et al. |
| 7,430,537 B2 | 9/2008 | Templeton et al. |
| D578,158 S | 10/2008 | Hammad et al. |
| D580,974 S | 11/2008 | Hammad |
| 7,451,917 B2 | 11/2008 | McCall et al. |
| D584,769 S | 1/2009 | Hammad |
| 7,482,925 B2 | 1/2009 | Hammad et al. |
| 7,493,487 B2 | 2/2009 | Phillips et al. |
| 7,500,607 B2 | 3/2009 | Williams |
| 7,527,208 B2 | 5/2009 | Hammad et al. |
| 7,540,015 B2 | 5/2009 | Friedman |
| 7,545,748 B1 | 6/2009 | Riddle |
| 7,548,890 B2 | 6/2009 | Shakkarwar |
| 7,571,124 B2 | 8/2009 | Bodin |
| 7,575,177 B2 | 8/2009 | Killian et al. |
| 7,610,216 B1 | 10/2009 | May et al. |
| 7,620,600 B2 | 11/2009 | Patil et al. |
| 7,653,597 B1 | 1/2010 | Stevanovski et al. |
| 7,665,657 B2 | 2/2010 | Huh |
| 7,731,086 B2 | 6/2010 | Saunders et al. |
| 7,740,168 B2 | 6/2010 | Hammad et al. |
| 7,761,374 B2 | 7/2010 | Sahota et al. |
| 7,810,165 B2 | 10/2010 | Hammad et al. |
| 7,818,264 B2 | 10/2010 | Hammad |
| 7,819,322 B2 | 10/2010 | Hammad et al. |
| 7,885,899 B1 | 2/2011 | Sancho |
| 7,899,753 B1 | 3/2011 | Everhart |
| 8,087,582 B2 | 1/2012 | Hammad et al. |
| 8,135,647 B2 | 3/2012 | Hammad et al. |
| 8,229,854 B2 | 7/2012 | Stephen et al. |
| 8,533,118 B2 | 9/2013 | Weller et al. |
| 10,089,624 B2 | 10/2018 | Hammad et al. |
| 2001/0037453 A1 | 11/2001 | Mitty et al. |
| 2001/0044777 A1 | 11/2001 | Haley et al. |
| 2001/0056409 A1 | 12/2001 | Bellovin et al. |
| 2002/0002681 A1 | 1/2002 | Kawano et al. |
| 2002/0007320 A1 | 1/2002 | Hogan et al. |
| 2002/0007352 A1 | 1/2002 | Fieschi et al. |
| 2002/0013711 A1 | 1/2002 | Ahuja et al. |
| 2002/0026396 A1 | 2/2002 | Dent et al. |
| 2002/0026478 A1 | 2/2002 | Rodgers et al. |
| 2002/0032661 A1 | 3/2002 | Schuba et al. |
| 2002/0035548 A1 | 3/2002 | Hogan et al. |
| 2002/0035622 A1 | 3/2002 | Barber |
| 2002/0038287 A1 | 3/2002 | Villaret et al. |
| 2002/0046186 A1 | 4/2002 | Nishio et al. |
| 2002/0046189 A1 | 4/2002 | Morita et al. |
| 2002/0049818 A1 | 4/2002 | Gilhuly et al. |
| 2002/0066014 A1 | 5/2002 | Dworkin et al. |
| 2002/0073044 A1 | 6/2002 | Singhal |
| 2002/0073046 A1 | 6/2002 | David |
| 2002/0077144 A1 | 6/2002 | Keller et al. |
| 2002/0077978 A1 | 6/2002 | O'Leary et al. |
| 2002/0088863 A1 | 7/2002 | Ou |
| 2002/0091562 A1 | 7/2002 | Siegel et al. |
| 2002/0091945 A1 | 7/2002 | Ross |
| 2002/0095388 A1 | 7/2002 | Yu et al. |
| 2002/0095389 A1 | 7/2002 | Gaines |
| 2002/0096570 A1 | 7/2002 | Wong et al. |
| 2002/0099642 A1 | 7/2002 | Schwankl et al. |
| 2002/0099665 A1 | 7/2002 | Burger et al. |
| 2002/0108062 A1 | 8/2002 | Nakajima et al. |
| 2002/0116341 A1 | 8/2002 | Hogan et al. |
| 2002/0116626 A1 | 8/2002 | Wood |
| 2002/0120587 A1 | 8/2002 | D'Agostino |
| 2002/0123972 A1 | 9/2002 | Hodgson et al. |
| 2002/0133462 A1 | 9/2002 | Shteyn |
| 2002/0138445 A1 | 9/2002 | Laage et al. |
| 2002/0147658 A1 | 10/2002 | Kwan |
| 2002/0152179 A1 | 10/2002 | Racov |
| 2002/0153424 A1 | 10/2002 | Li |
| 2002/0158747 A1 | 10/2002 | McGregor et al. |
| 2002/0161724 A1 | 10/2002 | Peters |
| 2002/0174030 A1 | 11/2002 | Praisner et al. |
| 2002/0180584 A1 | 12/2002 | McGregor et al. |
| 2002/0194499 A1 | 12/2002 | Audebert et al. |
| 2003/0001005 A1 | 1/2003 | Risafi et al. |
| 2003/0028481 A1 | 2/2003 | Flitcroft et al. |
| 2003/0033228 A1 | 2/2003 | Bosworth-Davies et al. |
| 2003/0050896 A1 | 3/2003 | Wiederin |
| 2003/0061110 A1 | 3/2003 | Bodin |
| 2003/0061168 A1 | 3/2003 | Routhenstein |
| 2003/0074317 A1 | 4/2003 | Hofi |
| 2003/0080185 A1 | 5/2003 | Werther |
| 2003/0085286 A1 | 5/2003 | Kelley et al. |
| 2003/0101137 A1 | 5/2003 | John, Jr. |
| 2003/0105710 A1 | 6/2003 | Barbara et al. |
| 2003/0105964 A1 | 6/2003 | Brainard et al. |
| 2003/0109300 A1 | 6/2003 | Walker et al. |
| 2003/0115142 A1 | 6/2003 | Brickell et al. |
| 2003/0126079 A1 | 7/2003 | Roberson et al. |
| 2003/0126094 A1 | 7/2003 | Fisher et al. |
| 2003/0135463 A1 | 7/2003 | Brown et al. |
| 2003/0140004 A1 | 7/2003 | O'Leary et al. |
| 2003/0140007 A1 | 7/2003 | Kramer et al. |
| 2003/0154406 A1 | 8/2003 | Honarvar et al. |
| 2003/0168510 A1 | 9/2003 | Allen |
| 2003/0169881 A1 | 9/2003 | Niedermeyer |
| 2003/0172040 A1 | 9/2003 | Kemper et al. |
| 2003/0200184 A1 | 10/2003 | Dominguez et al. |
| 2003/0208684 A1 | 11/2003 | Camacho et al. |
| 2003/0216996 A1 | 11/2003 | Cummings et al. |
| 2003/0222135 A1 | 12/2003 | Stoutenburg et al. |
| 2003/0225703 A1 | 12/2003 | Angel |
| 2004/0003285 A1 | 1/2004 | Whelan et al. |
| 2004/0014423 A1 | 1/2004 | Croome et al. |
| 2004/0015435 A1 | 1/2004 | Solomon et al. |
| 2004/0019564 A1 | 1/2004 | Goldthwaite et al. |
| 2004/0019970 A1 | 2/2004 | Landry |
| 2004/0024638 A1 | 2/2004 | Restis |
| 2004/0031856 A1 | 2/2004 | Atsmon et al. |
| 2004/0034604 A1 | 2/2004 | Klebanoff |
| 2004/0039694 A1 | 2/2004 | Dunn et al. |
| 2004/0059688 A1 | 3/2004 | Dominguez et al. |
| 2004/0064403 A1 | 4/2004 | Hasumi et al. |
| 2004/0078340 A1 | 4/2004 | Evans |
| 2004/0107170 A1 | 6/2004 | Labrou et al. |
| 2004/0122747 A1 | 6/2004 | Jimenez et al. |
| 2004/0128243 A1 | 7/2004 | Kavanagh et al. |

(56) References Cited

U.S. PATENT DOCUMENTS

| | | |
|---|---|---|
| 2004/0138955 A1 | 7/2004 | Song et al. |
| 2004/0153417 A1 | 8/2004 | Everhart |
| 2004/0156537 A1 | 8/2004 | Chung et al. |
| 2004/0171373 A1 | 9/2004 | Suda et al. |
| 2004/0171406 A1 | 9/2004 | Purk |
| 2004/0179684 A1 | 9/2004 | Appenzeller et al. |
| 2004/0185830 A1 | 9/2004 | Joao et al. |
| 2004/0187018 A1 | 9/2004 | Owen et al. |
| 2004/0254892 A1 | 12/2004 | Adamson |
| 2005/0029349 A1 | 2/2005 | McGregor et al. |
| 2005/0043997 A1 | 2/2005 | Sahota et al. |
| 2005/0060233 A1 | 3/2005 | Bonalle et al. |
| 2005/0060730 A1 | 3/2005 | Soeda et al. |
| 2005/0065876 A1 | 3/2005 | Kumar |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080730 A1 | 4/2005 | Sorrentino |
| 2005/0091152 A1 | 4/2005 | Suisa |
| 2005/0097320 A1 | 5/2005 | Golan et al. |
| 2005/0119978 A1 | 6/2005 | Ates |
| 2005/0122209 A1 | 6/2005 | Black |
| 2005/0149455 A1 | 7/2005 | Bruesewitz et al. |
| 2005/0167495 A1 | 8/2005 | Morley, Jr. et al. |
| 2005/0170814 A1 | 8/2005 | Joao et al. |
| 2005/0171905 A1 | 8/2005 | Wankmueller et al. |
| 2005/0184145 A1 | 8/2005 | Law et al. |
| 2005/0218229 A1 | 10/2005 | Morley, Jr. et al. |
| 2005/0228986 A1 | 10/2005 | Fukasawa et al. |
| 2005/0234822 A1 | 10/2005 | VanFleet et al. |
| 2005/0240527 A1 | 10/2005 | Goldman |
| 2005/0268107 A1 | 12/2005 | Harris et al. |
| 2005/0273442 A1 | 12/2005 | Bennett et al. |
| 2005/0278542 A1 | 12/2005 | Pierson et al. |
| 2006/0010072 A1 | 1/2006 | Eisen |
| 2006/0018523 A1 | 1/2006 | Saitoh et al. |
| 2006/0059110 A1 | 3/2006 | Madhok et al. |
| 2006/0074698 A1 | 4/2006 | Bishop et al. |
| 2006/0112275 A1 | 5/2006 | Jeal et al. |
| 2006/0136546 A1 | 6/2006 | Trioano et al. |
| 2006/0156385 A1 | 7/2006 | Chiviendacz et al. |
| 2006/0165060 A1 | 7/2006 | Dua |
| 2006/0202025 A1 | 9/2006 | Calabrese et al. |
| 2006/0219776 A1 | 10/2006 | Finn |
| 2006/0255128 A1 | 11/2006 | Johnson et al. |
| 2006/0278704 A1 | 12/2006 | Saunders et al. |
| 2006/0281439 A1 | 12/2006 | Benco et al. |
| 2006/0282382 A1 | 12/2006 | Balasubramanian et al. |
| 2006/0287955 A1 | 12/2006 | Moulart et al. |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0021126 A1 | 1/2007 | Nanda et al. |
| 2007/0034679 A1 | 2/2007 | Gauthier et al. |
| 2007/0034700 A1 | 2/2007 | Poidomani et al. |
| 2007/0045398 A1 | 3/2007 | Chen |
| 2007/0055630 A1 | 3/2007 | Gauthier et al. |
| 2007/0057034 A1 | 3/2007 | Gauthier et al. |
| 2007/0067833 A1 | 3/2007 | Colnot |
| 2007/0087813 A1 | 4/2007 | Walker et al. |
| 2007/0103274 A1 | 5/2007 | Berthold |
| 2007/0124801 A1 | 5/2007 | Thomas et al. |
| 2007/0130062 A1 | 6/2007 | Huh |
| 2007/0136131 A1 | 6/2007 | Mankoff |
| 2007/0136211 A1 | 6/2007 | Brown et al. |
| 2007/0143227 A1 | 6/2007 | Kranzley et al. |
| 2007/0143230 A1 | 6/2007 | Narainsamy et al. |
| 2007/0174082 A1 | 7/2007 | Singh |
| 2007/0174448 A1 | 7/2007 | Ahuja et al. |
| 2007/0192601 A1 | 8/2007 | Spain et al. |
| 2007/0214151 A1 | 9/2007 | Thomas et al. |
| 2007/0234409 A1 | 10/2007 | Eisen |
| 2007/0239606 A1 | 10/2007 | Eisen |
| 2007/0239622 A1 | 10/2007 | Routhenstein |
| 2007/0244830 A1 | 10/2007 | Hilderman |
| 2007/0250380 A1 | 10/2007 | Mankoff |
| 2007/0260544 A1 | 11/2007 | Wankmueller |
| 2007/0262138 A1 | 11/2007 | Somers et al. |
| 2007/0271596 A1 | 11/2007 | Boubion et al. |
| 2007/0276765 A1 | 11/2007 | Hazel et al. |
| 2007/0288641 A1 | 12/2007 | Lee et al. |
| 2007/0294182 A1 | 12/2007 | Hammad |
| 2008/0004121 A1 | 1/2008 | Gatto et al. |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0065553 A1 | 3/2008 | Faith et al. |
| 2008/0087722 A1 | 4/2008 | Collins |
| 2008/0103972 A1 | 5/2008 | Lane |
| 2008/0103982 A1 | 5/2008 | Hammad et al. |
| 2008/0104684 A1 | 5/2008 | Lunde et al. |
| 2008/0116264 A1 | 5/2008 | Hammad et al. |
| 2008/0120214 A1 | 5/2008 | Steele et al. |
| 2008/0120236 A1 | 5/2008 | Faith et al. |
| 2008/0120507 A1 | 5/2008 | Shakkarwar |
| 2008/0128513 A1 | 6/2008 | Hammad et al. |
| 2008/0133420 A1 | 6/2008 | Barber |
| 2008/0154760 A1 | 6/2008 | Calabrese et al. |
| 2008/0163257 A1 | 7/2008 | Carlson et al. |
| 2008/0179401 A1 | 7/2008 | Hart et al. |
| 2008/0183480 A1 | 7/2008 | Carlson et al. |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0232582 A1 | 9/2008 | Chevallier-Mames et al. |
| 2008/0235136 A1 | 9/2008 | Kemper et al. |
| 2008/0235138 A1 | 9/2008 | Yokota et al. |
| 2008/0244744 A1 | 10/2008 | Thomas et al. |
| 2008/0255992 A1 | 10/2008 | Lin |
| 2008/0288384 A1 | 11/2008 | Collins et al. |
| 2008/0288405 A1 | 11/2008 | John |
| 2008/0298588 A1 | 12/2008 | Shakkarwar |
| 2008/0302876 A1 | 12/2008 | Mullen |
| 2008/0303632 A1 | 12/2008 | Hammad |
| 2008/0319896 A1 | 12/2008 | Carlson et al. |
| 2008/0319904 A1 | 12/2008 | Carlson et al. |
| 2009/0037213 A1 | 2/2009 | Eisen |
| 2009/0048975 A1 | 2/2009 | Felger |
| 2009/0049529 A1 | 2/2009 | Felger |
| 2009/0055315 A1 | 2/2009 | Felger |
| 2009/0055892 A1 | 2/2009 | Lu et al. |
| 2009/0055893 A1 | 2/2009 | Manessis et al. |
| 2009/0083184 A1 | 3/2009 | Eisen |
| 2009/0083191 A1 | 3/2009 | Hammad |
| 2009/0089213 A1 | 4/2009 | Hammad |
| 2009/0099961 A1 | 4/2009 | Ogilvy |
| 2009/0150288 A1 | 6/2009 | Bishop et al. |
| 2009/0171682 A1 | 7/2009 | Dixon et al. |
| 2009/0171849 A1 | 7/2009 | Hammad |
| 2009/0202081 A1 | 8/2009 | Hammad et al. |
| 2009/0204524 A1 | 8/2009 | McGeorge |
| 2009/0271306 A1 | 10/2009 | Pierson |
| 2010/0024029 A1 | 1/2010 | Sasaki et al. |
| 2010/0036749 A1 | 2/2010 | Barber |
| 2010/0252623 A1 | 10/2010 | Hammad et al. |
| 2010/0262546 A1 | 10/2010 | Sahota et al. |
| 2011/0004526 A1 | 1/2011 | Hammad et al. |
| 2011/0004553 A1 | 1/2011 | Hammad |
| 2011/0231315 A1 | 9/2011 | Bandyopadhyay et al. |

OTHER PUBLICATIONS

"U.S. Appl. No. 11/536,296", Mobile Transit Fare Payment, filed Sep. 28, 2006, 35 pages.

"U.S. Appl. No. 11/566,614", Bank Issued Contactless Payment Card Used in Transit Fare Collection, filed Dec. 4, 2006, 35 pages.

"U.S. Appl. No. 11/680,589", Fraud Prevention for Transit Fare Collection, filed Feb. 28, 2007, 36 pages.

(56) References Cited

OTHER PUBLICATIONS

"U.S. Appl. No. 11/680,592", Verification of a Portable Consumer Device in an Offline Environment, filed Feb. 28, 2007, 28 pages.
"U.S. Appl. No. 11/680,594", Authentication of a Data Card Using a Transit Verification Value, filed Feb. 28, 2007, 37 pages.
"U.S. Appl. No. 11/761,821", Track Data Encryption, filed Jun. 12, 2007, 31 pages.
"U.S. Appl. No. 11/763,240", Consumer Authentication System and Method, filed Jun. 14, 2007, 36 pages.
U.S. Appl. No. 11/764,343 , "Final Office Action", dated Nov. 12, 2015, 14 pages.
U.S. Appl. No. 11/764,343 , "Final Office Action", dated Oct. 26, 2012, 18 pages.
U.S. Appl. No. 11/764,343 , "Final Office Action", dated Feb. 28, 2014, 9 pages.
U.S. Appl. No. 11/764,343 , "Non Final Office Action", dated Aug. 1, 2013, 10 pages.
U.S. Appl. No. 11/764,343 , "Non Final Office Action", dated Feb. 3, 2012, 15 pages.
U.S. Appl. No. 11/764,343 , "Non Final Office Action", dated Apr. 29, 2015, 12 pages.
"U.S. Appl. No. 11/764,351", Terminal Data Encryption, dated Jun. 18, 2007, 35 pages.
"U.S. Appl. No. 11/764,361", Portable Consumer Device Verification System, filed Jun. 18, 2007, 36 pages.
U.S. Appl. No. 11/764,370 , "Final Office Action", dated Dec. 14, 2012, 15 pages.
U.S. Appl. No. 11/764,370 , "Final Office Action", dated May 16, 2016, 18 pages.
U.S. Appl. No. 11/764,370 , "Final Office Action", dated May 11, 2017, 21 pages.
U.S. Appl. No. 11/764,370 , "Non-Final Office Action", dated Jan. 2, 2015, 14 pages.
U.S. Appl. No. 11/764,370 , "Non-Final Office Action", dated Jul. 5, 2012, 18 pages.
U.S. Appl. No. 11/764,370 , "Non-Final Office Action", dated Nov. 2, 2016, 22 pages.
"U.S. Appl. No. 11/764,370", Verfication Error Reduction System, filed Jun. 18, 2007, 24 pages.
"U.S. Appl. No. 11/764,376", Verfication Value System and Method, filed Jun. 18, 2007, 25 pages.
"U.S. Appl. No. 11/764,622", Portable Consumer Device Configured to Generate Dynamic Authentication Data, filed Jun. 18, 2007, 29 pages.
"U.S. Appl. No. 11/811,875", Shielding of Portable Consumer Device, filed Jun. 11, 2007, 26 pages.
"U.S. Appl. No. 11/935,740", Adaptive Authentication Options, filed Nov. 6, 2007, 29 pages.
"U.S. Appl. No. 11/940,074", Method and System Using Candidate Dynamic Data Elements, filed Nov. 14, 2007, 30 pages.
"U.S. Appl. No. 11/962,836", Customized Payment Transaction Notification, filed Dec. 21, 2007, 31 pages.
"U.S. Appl. No. 11/963,736", Real-Time Balance Updates,, filed Dec. 21, 2007, 24 pages.
"U.S. Appl. No. 11/966,233", Contactless Prepaid Product for Transit Fare Collection, filed Dec. 28, 2007, 32 pages.
"U.S. Appl. No. 12/022,060", Payment Using a Mobile Device, filed Jan. 29, 2008, 48 pages.
"U.S. Appl. No. 12/022,075", Smart Sign Mobile Transit Fare Payment, filed Jan. 29, 2008, 53 pages.
"U.S. Appl. No. 12/028,220", Key Delivery System and Method, filed Feb. 8, 2008, 26 pages.
U.S. Appl. No. 16/123,996 , "Non-Final Office Action", dated Sep. 25, 2020, 26 pages.
U.S. Appl. No. 16/123,996 , "Non-Final Office Action", dated Apr. 2, 2020, 9 pages.
U.S. Appl. No. 16/123,996 , "Notice of Allowance", dated Apr. 28, 2021, 10 pages.
"U.S. Appl. No. 29/263,226", Antenna Layout for Contactless Data Card, filed Jul. 17, 2006, 8 pages.
"U.S. Appl. No. 29/266,546", Communication Device, filed Sep. 22, 2006, 15 pages.
"U.S. Appl. No. 29/279,367", Symmetrical Communication Device with Ornamental Band with Shield, filed Apr. 27, 2007, 11 pages.
"U.S. Appl. No. 29/279,368", Symmetrical Contactless Data Card with off Center Aperture and Shield, filed Apr. 27, 2007, 11 pages.
"U.S. Appl. No. 29/279,369", Asymmetrical Data Device with Indentation with Shield, filed Apr. 27, 2007, 6 pages.
"U.S. Appl. No. 29/279,370", Communication Device with Different Geometrical Ends with Shield, filed Apr. 27, 2007, 17 pages.
"U.S. Appl. No. 29/279,371", Portable Data Device with External Aperture with Shield, filed Apr. 27, 2007, 9 pages.
"U.S. Appl. No. 29/281,167", Asymmetrical Shape for Wireless Payment Token, filed Jun. 15, 2007, 6 pages.
"U.S. Appl. No. 29/306,280", Antenna Layout for Contactless Data Card, filed Apr. 4, 2018, 8 pages.
PCT/US2003/06999 , "International Preliminary Exmination Report", dated Nov. 17, 2003, 3 pages.
PCT/US2003/06999 , "International Search Report", dated May 22, 2003, 1 page.
PCT/US2004/26813 , "International Search Report and Written Opinion", dated May 7, 2007, 5 pages.
PCT/US2007/071200 , "International Search Report and Written Opinion", dated Dec. 6, 2007, 7 pages.
PCT/US2007/071301 , "International Preliminary Report on Patentability", dated Feb. 3, 2011, 3 pages.
PCT/US2007/071301 , "International Search Report and Written Opinion", dated Aug. 5, 2008, 4 pages.
PCT/US2007/071480 , "International Search Report", dated Mar. 28, 2008, 1 page.
PCT/US2007/71376 , "International Search Report and Written Opinion", dated Apr. 10, 2008, 11 pages.
PCT/US2007/71479 , "International Search Report and Written Opinion", dated Feb. 22, 2008, 5 pages.
PCT/US2007/71518, "International Search Report and Written Opinion", dated Jul. 15, 2008, 8 pages.

| PAN | EXP DATE | SERV CODE | PIN CVV | DISC DATA |

TRANSACTION AUTHENTICATION USING NETWORK

CROSS-REFERENCES TO RELATED APPLICATIONS

This application is a continuation of U.S. patent application Ser. No. 16/123,996 filed on Sep. 6, 2018, which is a continuation of U.S. patent application Ser. No. 11/764,343, now abandoned, filed on Jun. 18, 2007, which is a non-provisional patent application of and claims the benefit of the filing dates of U.S. Provisional Patent Application No. 60/815,059, filed on Jun. 19, 2006, U.S. Provisional Patent Application No. 60/815,430 filed on Jun. 20, 2006, and U.S. Provisional Patent Application No. 60/884,089 filed on Jan. 9, 2007. All of these applications are herein incorporated by reference in their entirety for all purposes.

BACKGROUND

There are a number of ways to ensure that payment transactions are securely conducted. For example, there are a number of different ways to authenticate a consumer to ensure that the authentic consumer is the one conducting the payment transaction. There are also a number of different ways to authenticate a portable consumer device that is being used by the consumer.

Although different ways of authenticating payment transactions exist, improved authentication mechanisms are desirable to further reduce the risk of fraudulent transactions.

Embodiments of the invention address these and other problems individually and collectively.

SUMMARY

Systems and methods for improved consumer and portable consumer device authentication are disclosed. Embodiments of the invention include ways to authenticate a portable consumer device such as a payment card, authenticate a consumer using the portable consumer device, perform back end processing, and provide consumer notification of purchase transactions.

One embodiment of the invention is directed to a method comprising: performing an authentication process for a consumer, wherein the consumer uses a portable consumer device to conduct a transaction; performing an authentication process for the portable consumer device, wherein performing the authentication process for the portable consumer device comprises verifying a fingerprint or a dynamic verification value associated with the portable consumer device; and performing a risk analysis after authenticating the consumer and authenticating the portable consumer device are performed, wherein the risk analysis determines whether or not the transaction is to be authorized.

One embodiment of the invention is directed to a method comprising: authenticating a portable consumer device using dynamic data generated by the portable consumer device or an access device in communication with the portable consumer device; and authenticating the consumer comprising sending a challenge message to the consumer, and receiving a challenge response from the consumer.

Another embodiment of the invention is directed to a method comprising: receiving an authorization request message associated with a transaction conducted using a portable consumer device, wherein the portable consumer device comprises a portable consumer device fingerprint, and wherein the authorization request message comprises an altered portable consumer device fingerprint and an algorithm identifier; selecting an algorithm from among a plurality of algorithms using the algorithm identifier; determining the portable consumer device fingerprint using the selected algorithm and the altered portable consumer device fingerprint; determining if the portable consumer device fingerprint matches a stored portable consumer device fingerprint; sending a challenge message to a consumer associated with the portable consumer device; and sending an authorization response message to the consumer, wherein the authorization response message indicates whether or not the transaction is approved.

Another embodiment of the invention is directed to a method comprising: authenticating a batteryless portable consumer device, wherein the portable consumer device comprises a batteryless portable consumer comprising an antenna; authenticating the consumer; and sending a notification message to the consumer that a transaction is being conducted.

Other embodiments of the invention are directed to specific combinations of other authentication aspects, which are provided below in the Detailed Description.

DETAILED DESCRIPTION

I. Exemplary Systems and Payment Transactions

Embodiments of the invention can be used to authenticate conventional purchase transactions as well as other types of transactions (e.g., money transfer transactions). Specific authentication systems and methods may involve the authentication of the consumer (e.g., a purchaser), portable consumer device (e.g., a credit card), and/or access device (e.g., a POS terminal) to ensure that the transaction is authentic.

In a typical purchase transaction, a consumer uses a portable consumer device (e.g., a credit card) to purchase goods or services from a merchant.

Figure 1:
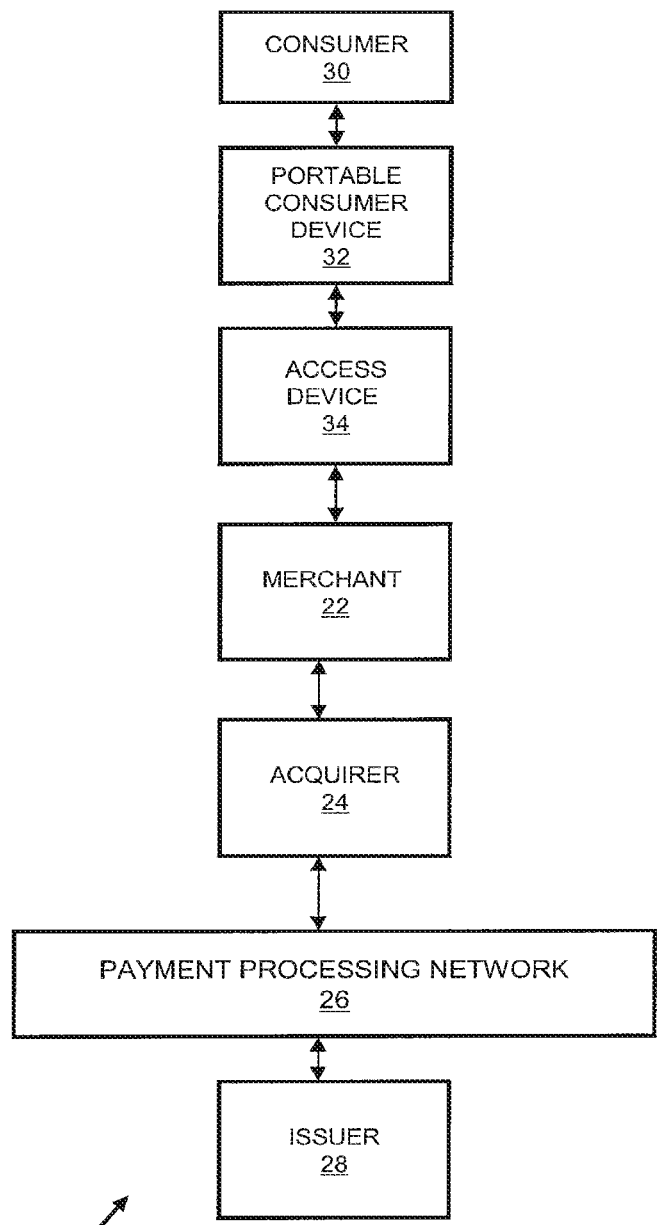
FIG. 1 shows a block diagram of a system according to an embodiment of the invention.

FIG. 1 shows a system 20 that can be used in an embodiment of the invention. The system 20 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing network 26.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may take a credit card and may swipe it through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 (step 56) to indicate whether or not the current transaction is authorized (or not authorized). The payment processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 24, or may be printed out on a receipt.

At the end of the day, a normal clearing and settlement process can be conducted by the payment processing network 26. A clearing process is a process of exchanging financial details between and acquirer and an issuer to facilitate posting to a consumer's account and reconciliation of the consumer's settlement position. Clearing and settlement can occur simultaneously.

II. Transaction Authentication

Figure 2:
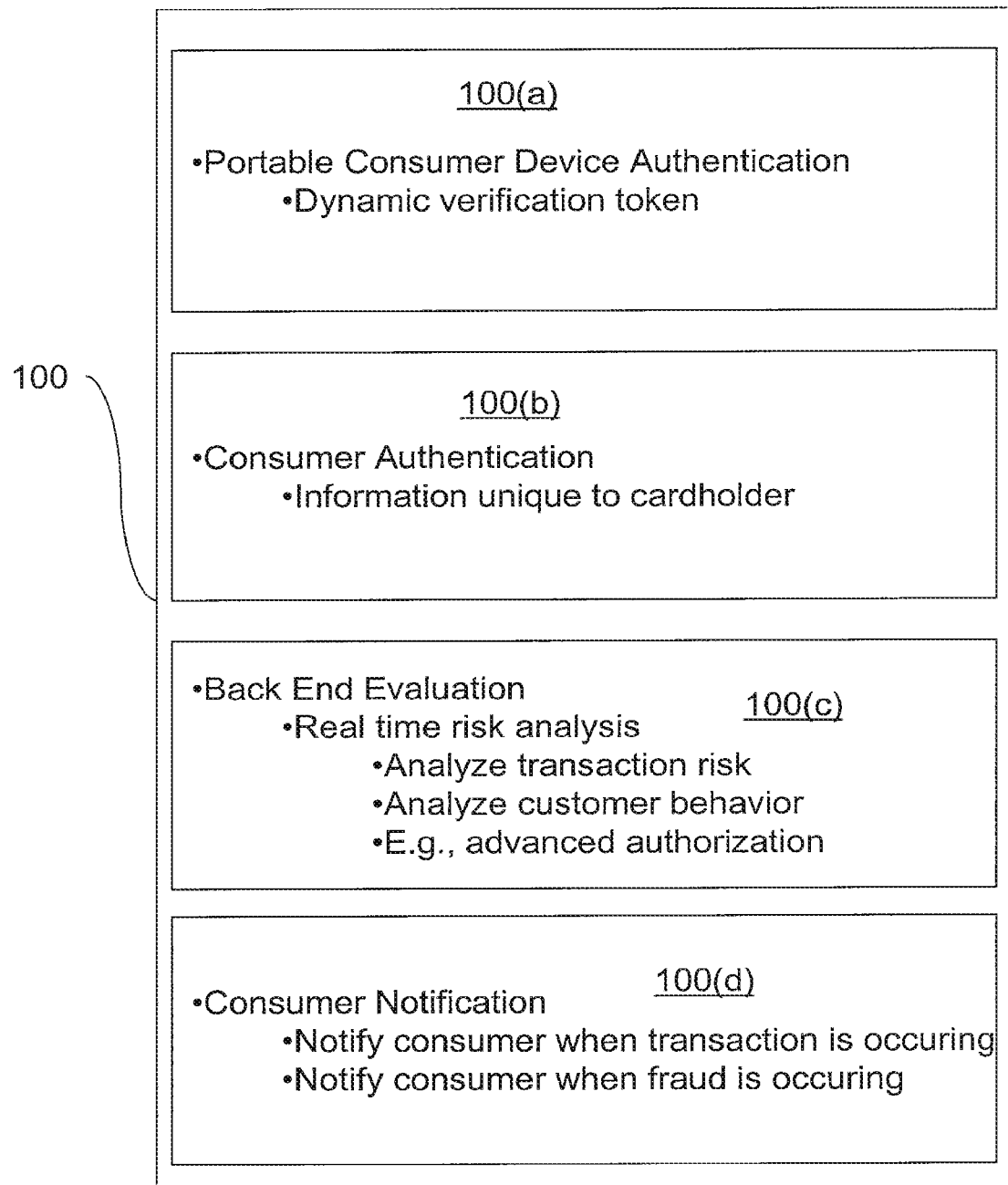
FIG. 2 shows a block diagram of aspects of a payment transaction authentication system according to an embodiment of the invention.

Referring to FIG. 2, which shows a conceptual block diagram 100, the authentication of a purchase transaction like the one described above can have various aspects. Such aspects include portable consumer device authentication 100(*a*), consumer authentication 100(*b*), back end processing including real time risk analysis 100(*c*), and consumer notification of the purchase transaction 100(*d*).

Portable consumer device authentication relates to the authentication of the portable consumer device. That is, in a portable consumer device authentication process, a determination is made as to whether the portable consumer device that is being used in the purchase transaction is the authentic portable consumer device or a counterfeit portable consumer device. Specific exemplary techniques for improving the authentication of a portable consumer device include:

Dynamic CVV on portable consumer devices such as magnetic stripe cards
  Card security features (existing and new)
  Contactless chips (limited use)
  Magnetic stripe identification
  Card Verification Values (CVV and CVV2)
  Contact EMV chips Consumer authentication relates to a determination as to whether or not the person conducting the transaction is in fact the owner or authorized user of the portable consumer device. Conventional consumer authentication processes are conducted by the merchants. For example, merchants may ask to see a credit card holder's driver's license, before conducting a business transaction with the credit card holder. Other ways to authenticate the consumer would be desirable, since consumer authentication at the merchant does not occur in every instance. Specific examples of possible ways to improve the consumer authentication process include at least the following:

Knowledge-based challenge-responses
  Hardware tokens (multiple solution options)
  OTPs (one time password, limited use)
  AVSs (not as a stand alone solution)
  Signatures
  Software tokens PINs (online/offline)
User IDs/Passcodes
Two-channel authentication processes (e.g., via phone)
Biometrics Back end processing relates to processing that may occur at the issuer or payment processing network, or other non-merchant location. As will be explained in detail below, various processes may be performed at the "back end" of the payment transaction to help ensure that any transactions being conducted are authentic. Back end processing may also prevent transactions that should not be authorized, and can allow transactions that should be authorized.

Lastly, consumer notification is another aspect of transaction authentication. In some cases, a consumer may be notified that a purchase transaction is occurring or has occurred. If the consumer is notified (e.g., via cell phone) that a transaction is occurring using his portable consumer device, and the consumer is in fact not conducting the transaction, then appropriate steps may be taken to prevent the transaction from occurring. Specific examples of consumer notification processes include:
Purchase notification via SMS
Purchase notification via e-mail
Purchase notification by phone Specific details regarding some of the above-described aspects are provided below. The specific details of the specific aspects may be combined in any suitable manner without departing from the spirit and scope of embodiments of the invention. For example, portable consumer device authentication, consumer authentication, back end processing, and consumer transaction notification may all be combined in some embodiments of the invention. However, other embodiments of the invention may be directed to specific embodiments relating to each individual aspects, or specific combinations these individual aspects.

III. Portable Consumer Device Authentication

Improvements can be made with respect to various portable consumer device authentication processes. Examples of such improvements are provided below.

A. Dynamic Card Verification Values (dCVVs)

To help ensure that the portable consumer device being used in a payment transaction is in fact the authentic portable consumer device, "dynamic" data may be provided from the portable consumer device. Dynamic data is data that may change over time, and is therefore more secure than static data (e.g., a name). For example, a portable consumer device authentication process may include "dynamic" verification data such as a dynamic CVV (or dynamic card verification value).

In comparison, "static" data may be data that does not change over time. For example, today, credit cards have card verification values (CVV values) printed on the back of the cards. These values can be used to verify that the portable consumer device being used is authentic. For example, when conducting a purchase transaction over the telephone or the Internet using a credit card, a merchant may ask for the CVV value on the back of the credit card. The CVV value may be matched to the credit card number to ensure that the caller in fact possesses the authentic portable consumer device. One problem with current CVVs is that they are static. They can be stolen and used.

Dynamic CVV ("dCVV") is described in U.S. patent application Ser. No. 10/642,878, which is herein incorporated by reference in its entirety for all purposes. U.S. patent application Ser. No. 10/642,878 describes the generation of a verification value using information including a PAN (primary account number), an expiration date, a service code, and an automatic transaction counter. This verification value is transmitted from a merchant to a service provider (e.g., a payment processing organization or an issuer) where it is decoded and evaluated for possible approval. The automatic transaction counter keeps track of the number of times that a portable consumer device is used, and if there is a mismatch between a counter value that is received at the issuer and the counter at the issuer, then this may indicate possible data skimming or fraudulent use.

The dCVV or other dynamic data may be transmitted using any suitable secure data transmission process and may use DES (dynamic encryption standard), as well as ECC (elliptical curve cryptography), or AEC (advanced encryption cryptography). Any symmetric or asymmetric cryptographic elements may be used.

Other security enhancements of the dCVV process may include the use of a longer DES number and a longer counter.

B. dCVVs Created with Specific Input Data

It would be desirable to improve upon prior dCVV processes by generating different dynamic verification values using different data or different types of variable information. For example, more transaction and/or user specific data could be dynamically changed to verify that the portable consumer device is the correct one. This would be more secure than using just a simple counter. For example, specific information could include the following: terminal ID, time of day, telephone number, SIM card number, transaction amount, account number, service code (two digits), expiration date, current date, random numbers from the terminal, etc. The specific information preferably includes at least one dynamic data element such as a counter, time of day, purchase amount, etc. In other embodiments, the specific information used to create the dynamic verification value includes dynamic, consumer specific or transaction specific information such as the time of day when the transaction is taking place, the purchase amount, prior transaction data, etc. Any, some, or all of these may be used to create a verification value or other specific pieces of information could be dynamically altered to create a new dCVV. The new dCW could then be processed in a manner that is similar to, or different than, the general process scheme described in U.S. patent application Ser. No. 10/642,878. In one specific example, data regarding a prior transaction (e.g., a prior purchase amount, the time of a prior purchase, etc.) may be a dynamic data element, which may be used to authenticate a portable consumer device for future transactions. Further details regarding such dCW methods can be found in U.S. patent application Ser. No. 11/764,376, entitled Method and System for Generating a Dynamic Verification Value, filed Jun. 18, 2007.

C. Reducing the Number of Rejected dCVV Transactions

The above described dCVV processes are useful. However, there may be a number of instances where the dynamic data (e.g., a counter value) transmitted from a portable consumer device and received at a service provider's server does not match the corresponding dynamic data (another corresponding counter value) that are generated at the issuer's server. For example, sometimes, a merchant might not forward transaction data to the issuer in a timely manner. If this occurs, it is possible that future transactions conducted by the consumer could be inadvertently rejected. For instance, if the portable consumer device used by the consumer has a counter in it to count the number of transactions conducted, and if the counter in the issuer's server does not keep a corresponding transaction count, because of the delayed receipt of transaction data from one or more merchants, some of the consumer's transactions may be inadvertently rejected. It is desirable to approve as many transactions as possible while disapproving transactions that may have been skimmed.

The solution to this problem may include widening the range of the transaction counter (or widening the tolerance of some other variable data such as the time, date, etc.) so that there is some margin for potential error. For example, a consumer's portable consumer device may have a counter in it that currently has a transaction total equal to 100. When the consumer conducts a transaction at a POS terminal, an authorization message may be sent from the POS terminal to the issuer's or payment processing network's server. The authorization message may indicate that this is transaction number 100 for consumer A. The issuer's server may then check a corresponding counter range. If the received transaction counter falls within the corresponding counter range determined by the issuer, then the transaction is approved. For example, the corresponding counter range may be between 98 and 102. Since the consumer's counter is 100 and falls between 98 and 102, the transaction is approved. Thus, if the issuer's server has a counter that has a value that is slightly different than the counter on the consumer's portable consumer device, the transaction will not be inadvertently rejected. If actual data skimming is occurring or if a consumer's payment account number is being used without authorization, the counter at the issuer's server would likely differ significantly from the actual counter on the consumer's portable consumer device.

These embodiments of the invention can help decrease the number of false transaction denials. As an alternative or additional authentication measure, the issuer may provide a challenge question (e.g., what is your birthday) to the consumer if the issuer's server finds that the transaction counter received from the POS terminal and the transaction counter at the issuer's server do not match, or if the counter is not within a predetermined counter range determined by the issuer's server computer. If the consumer answers the challenge question correctly, then the transaction is approved. If the question is not answered correctly, then it is not approved. Additional details about possible challenge messages and challenge questions that can be used in such embodiments are provided below.

In yet other embodiments, the decision as to whether or not to perform further authentication processing (e.g., sending a challenge question to a consumer) or not perform further authentication processing if the counter (or other dynamic data element) falls within the predetermined range can be based on other factors. For example, if the counter or other dynamic data element falls within a predetermined range, further authentication processing may only take place if the transaction being analyzed is greater than a predetermined dollar limit (e.g., over $1000) or the transaction being analyzed is being conducted from a location or merchant that may indicate a higher tendency to originate fraudulent transactions. Thus, embodiments of the invention may include other variables that may be considered when determining whether or not to perform additional authentication processing.

Further details regarding embodiments that use ranges in conjunction with dynamic data elements used with verification values are in U.S. patent application Ser. No. 11/764,370, entitled Verification Error Reduction System, filed on Jun. 18, 2007 which is herein incorporated by reference in its entirety for all purposes.

D. Portable Consumer Devices that can Produce dCVVs

A number of different portable consumer devices may be produced, which are capable of providing variable transaction data such as counters. An example of this kind of portable consumer device includes a magnetic-stripe card that can rewrite the data provided on its magnetic stripe. A re-writing device such as a magnetic write head may be used to rewrite the data on a magnetic stripe. A patent that discusses this type of card is U.S. Pat. No. 7,044,394, which is herein incorporated by reference in its entirety for all purposes. A battery is within the card and can supply power for the re-writing device.

The use of batteries in payment cards is not particularly desirable in some cases. For example, batteries need to be replaced and disposed of in an environmentally friendly manner. Also, if a battery-powered card does not have sufficient power at a given moment, a particular transaction conducted with that card may not take place as intended. In addition, if a consumer has multiple battery-powered cards in his wallet, this can raise potential security issues when traveling on airlines. Thus, batteryless cards are preferred.

In some embodiments, the portable consumer devices are batteryless cards (or other batteryless form factors) which contain may contain chip which may comprise a counter. These batteryless cards are powered by some external power source, instead of an internal battery. Examples of external power sources include access devices such as POS terminals and transaction calculators. In embodiments of the invention, each time a batteryless card is powered by an external power source such as a POS terminal, a counter value (or other variable data) may be produced by the batteryless card. A number of specific embodiments are shown in FIGS. 3(a)-3(c).

Figure 3:
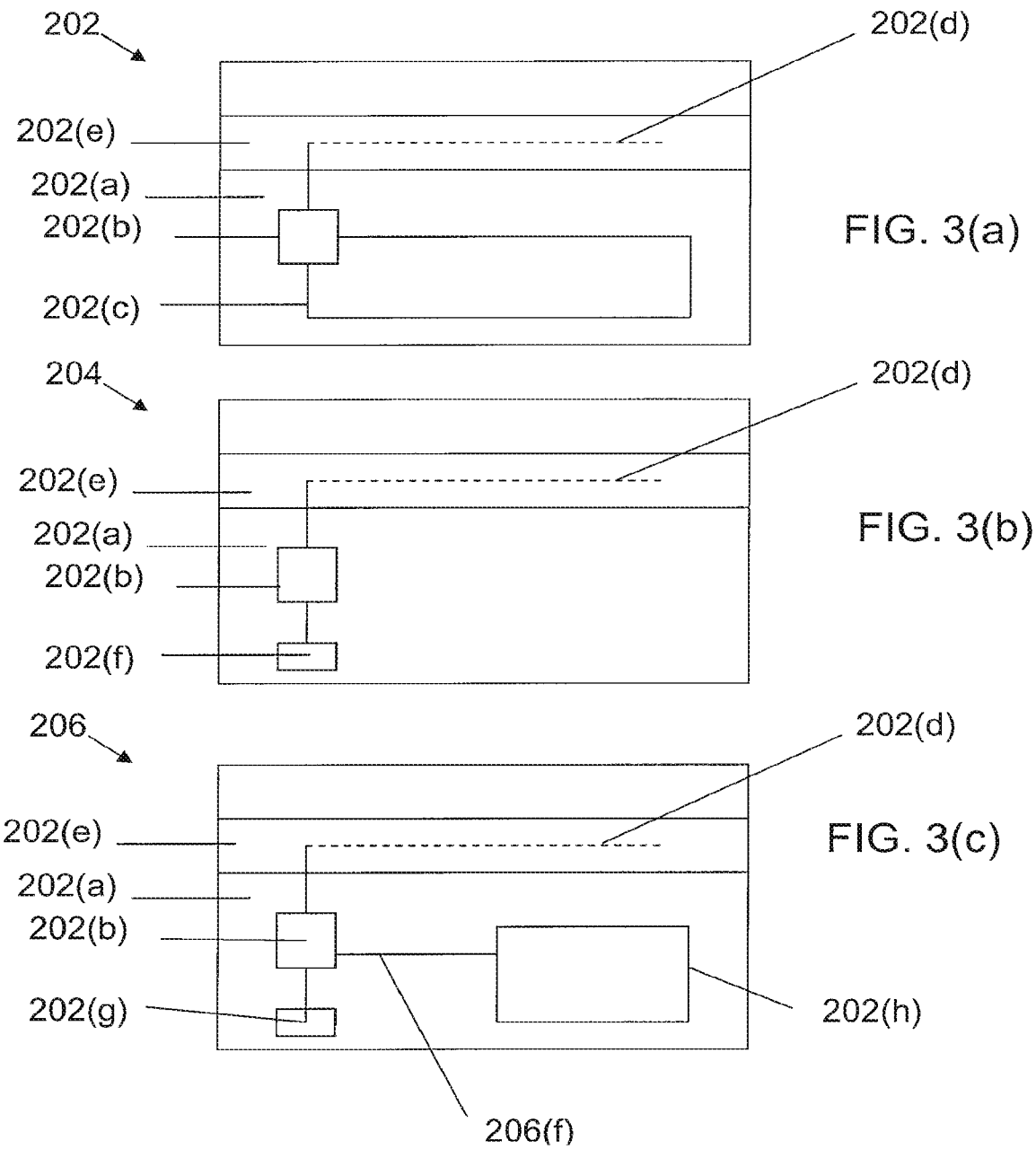
FIGS. 3(a)-3(c) show schematic views of batteryless cards according to embodiments of the invention.

FIG. 3(a) shows a magnetic stripe card 202 including a plastic body 202(a). A magnetic stripe 202(e) is on the plastic body 202(a). The plastic body 202(a) may include an embossed region, which may have information such as cardholder name, card number, and expiration date (not shown). A processor (e.g., a microprocessor) 202(b) is on the plastic body 202(a), and a read-write device 202(d) and an antenna 202(c) are coupled to the processor 202(b). In this example, the antenna 202(c) is a coil of wire which can receive power from a contactless card reader (not shown).

During use, the antenna 202(c) may allow the magnetic stripe card 202 to communicate with an external contactless reader (not shown) so that an account number and optionally counter information (or other variable data) may be obtained from magnetic stripe 202(e) via the processor 202(b) and the read-write device 202(d). At the same time, the antenna 202(c) may also be used to power the processor 202(b) and the read-write device 202(d) temporarily so that the read-write device 202(d) can also change dynamic data (e.g., a counter) on the magnetic stripe 202(e). Thus, as illustrated by this example, embodiments of the invention can include the use of a batteryless magnetic-stripe card that can provide dynamic data that can be used in a portable consumer device authentication transaction.

Although the example in FIG. 3(a) includes a read-write device 202(d) for a magnetic stripe 202(e), in other embodiments, the read-write device may be embodied by logic which may read and/or write data to a volatile or semi-volatile solid-state memory device such as a flash memory chip or the like.

Another card embodiment 204 of the invention is shown in FIG. 3(b). In FIGS. 3(a) and 3(b), like numerals designate like elements. However, in FIG. 3(b), a conductive contact region 202(f) is shown and the conductive contact is coupled to the processor 202(b) instead of an antenna. In this example, the contact region 202(f) may include multiple electrical contacts so that it may interface with and electrically contact a corresponding contact region in a card reader (not shown). When the card 204 is used, power can be supplied to the processor 202(b) via the conductive contact 204(f), and the read-write device 202(d) can function as described above.

FIG. 3(c) shows another magnetic stripe card 206 according to an embodiment of the invention. It includes a portable consumer device reader interface region such as a interface region 202(g), which may take the form of the above-described antenna 202(c) or electrically conductive contact 202(f). Power can be supplied to the processor 202(b) and the read-write device 202(d) via the interface region 202(g) as described above.

However, in this embodiment, a semi-static display 202(h) is coupled to the processor 202(b). Each time the processor 202(b) is powered by a card reader during a purchase transaction, the processor 202(b) can cause the display 202(h) to display a verification value such as a dynamic card verification value (dCVV). The dCVV may be viewed by a consumer and used in a mail order, telephone, or Internet purchase transaction to help verify that the consumer has an authentic card. In this example, the same or different dCVV value (or other dynamic data) may be electronically transmitted to the card reader and subsequently transmitted in an authorization request message to the issuer for further verification.

Figure 4:
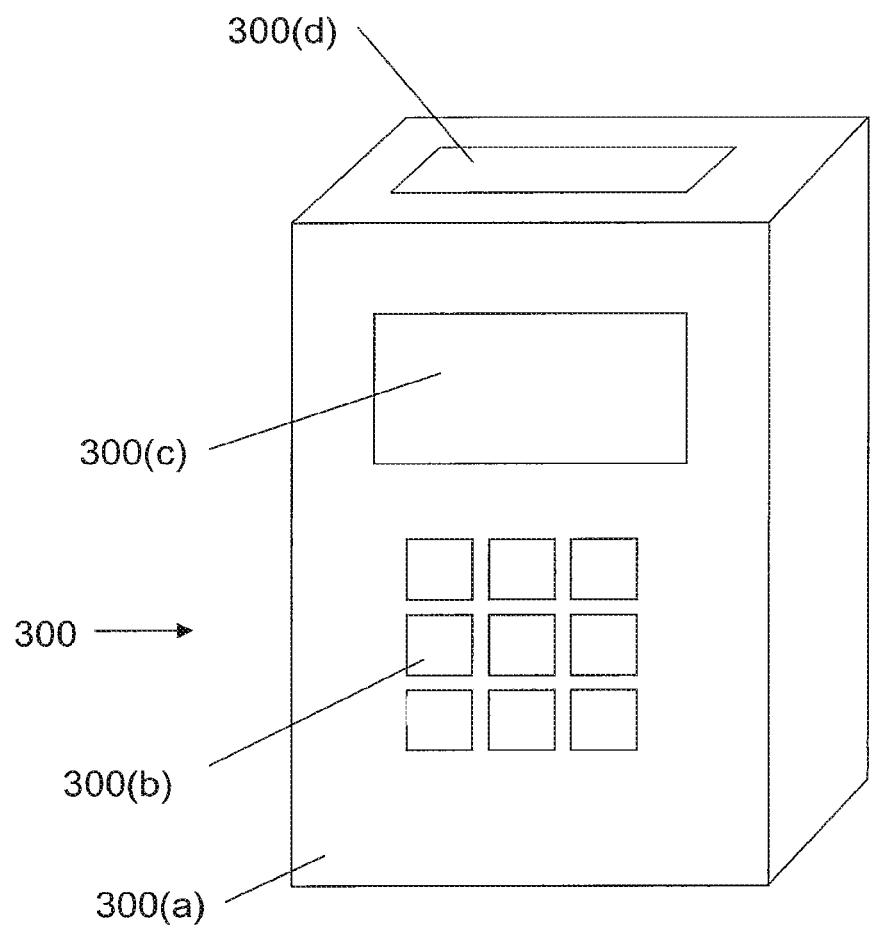
FIG. 4 shows a portable security device.

FIG. 4 shows a security device 300 which can be used to power cards of the type shown in FIGS. 3(a)-3(c). The security device 300 may have a data input region 300(b) (e.g., keys) on a housing 300(a). The housing 300(a) may define a slot 300(d) which can receive a batteryless card like those described above. A display 300(c) is also present on the housing 300(a).

The security device 300 may contain a microprocessor, batteries, and a memory comprising computer code for producing a one-time transaction code or number for a consumer purchase transaction. The logic for producing the one-time transaction code may also reside on another server or computer (e.g., an issuer's server) so that the issuer, merchant, or other party, can verify that the person holding the card is in fact the authorized cardholder. In this example, the security device 300 may be characterized as a hard security token and may be used to help authenticate the consumer.

During use, a consumer may insert a batteryless magnetic stripe card (as described above) into the slot 300(d). A one time transaction code may then be displayed on the screen 300(c). When the card is inserted into the security device 300, power from the power source in the security device 300 powers a processor and read-write device in the card so that dynamic data (e.g., a counter) on the card can change. Thus, the security device 300 can produce a one time transaction number for a transaction, and also temporarily supply power to a batteryless card so that a counter (or other dynamic element) can change in the card. A system using both the security device 300 and a batteryless card that can have dynamic data can advantageously authenticate both the consumer as well as the portable consumer device.

Further details regarding embodiments that use batteryless portable consumer devices are in U.S. patent application Ser. No. 11/764,622, entitled Portable Consumer Device Configured To Generate Dynamic Authentication Data, filed on Jun. 18, 2007 which is herein incorporated by reference in its entirety for all purposes E. Masked Primary Account Numbers (PANs)

Another way to authenticate a portable consumer device is to use a masked PAN or primary account number. In this example, a partial portion of a transmitted PAN is masked and/or dynamically changed. The PAN includes an identification number portion such as a BIN number or bank identification number. Other examples of identification number portions include a merchant location, financial institution location, or even an IP address. The last four digits of the PAN and the BIN number will remain the same, while other numbers in the PAN change. These dynamically changing numbers are typically masked on a payment card receipt that is received by a consumer so that the consumer does not see anything unusual.

Figures 5, 6:
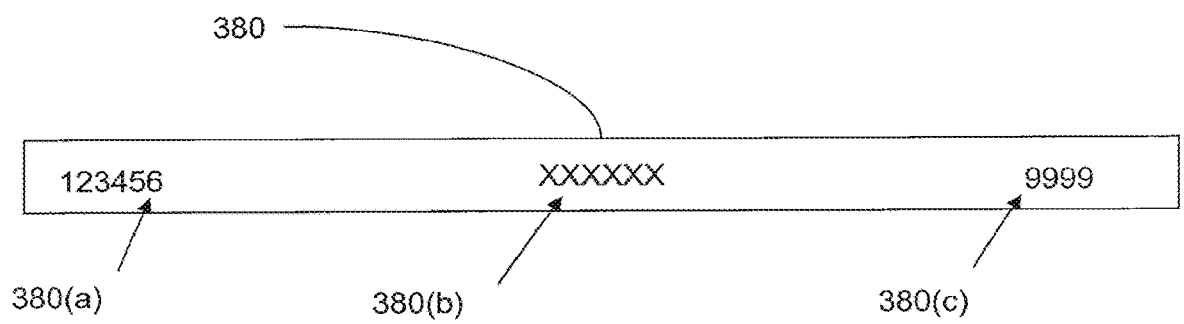
FIG. 5 shows a representation of data fields associated with a portable consumer device such as a credit card.
FIG. 6 shows parts of a primary account number (PAN).

FIG. 5 shows a schematic diagram of data fields for data that is transmitted from a merchant to an issuer in a purchase transaction. The data fields include PAN, expiration date, service code, PIN CVV, and discretionary data fields.

An exemplary PAN 380 that might reside in memory (e.g., a magnetic stripe) in a portable consumer device is shown in FIG. 6. In this example, the first six digits (i.e., a first end portion) "123456" 380(a) of the PAN 380 would correspond to the BIN number. The next 6 digits 380(b) may be changed or different from the real PAN's 6 digits and are represented by "XXXXXX" in this example. The last four digits 380(c) (i.e., a last end portion) are "9999" in this example, and would remain the same. By keeping the BIN the same and the last four digits the same, the transaction will look like a real one to the merchant and the consumer. In a preferred embodiment, the middle six digits are dynamically changed using a counter or the like. This makes it more difficult for any unauthorized person to determine the real PAN.

In one embodiment, the middle portion of the PAN that resides in the memory of the portable consumer device may be different than the middle portion of the real PAN. The PAN that resides in memory may be referred to as a secondary PAN while the real PAN may be referred to as a primary PAN. An appropriate algorithm or look-up table (e.g., stored at the issuer or in an access device such as a POS device) may be used to link the primary and secondary PANs. For example, the middle six digits of the PAN number might be 666666 in a primary PAN (e.g., 1234566666669999), but the middle six digits might be 222222 in the secondary PAN (e.g., 1234562222229999) which is stored in the memory in a consumer's portable consumer device. In one embodiment, the secondary PAN may be received at a POS terminal and the POS terminal may convert the secondary PAN to the primary PAN and the primary PAN may be transmitted from the POS terminal to the issuer for processing and/or authorization. In another embodiment, the secondary PAN may be transmitted to the issuer and the issuer may convert the secondary PAN to the primary PAN, and may thereafter process and/or authorize the transaction.

In this embodiment, the issuer may receive both the primary PAN and the secondary PAN to verify that the portable consumer device being used is authentic. If an unauthorized person tries to use the primary PAN, then that unauthorized person will not know the secondary PAN and cannot fraudulently conduct a purchase transaction without knowing the secondary PAN. Alternatively, if an unauthorized person electronically intercepts or "skims" the secondary PAN, then the unauthorized person will not be able to conduct the purchase transaction without knowing the primary PAN.

In another embodiment, the middle portion of the PAN may be changed dynamically. For example, an appropriate algorithm or counter may be used to dynamically change the middle portion of the PAN each time the portable consumer device is used. This way, even if the PAN is electronically intercepted by an unauthorized person, and knows the primary PAN, the secondary PAN will be dynamically changing. Even if the unauthorized person knows the primary PAN and intercepts the secondary PAN once, the intercepted secondary PAN would be useless, since it is a dynamically changing secondary PAN. In this case, the unauthorized person would need to know the algorithm used to dynamically change the PAN in addition to the primary PAN and the secondary PAN. Thus, this embodiment is particularly useful for conducting secure transactions.

Further details regarding embodiments that use masked primary account numbers are in U.S. patent application Ser. No. 11/761,821, entitled Track Data Encryption, filed on Jun. 12, 2007, which is herein incorporated by reference in its entirety for all purposes.

VI. Consumer Authentication

As noted above, a number of consumer authentication processes can be used in embodiments of the invention. Specific examples of possible ways to improve the authentication of a consumer include:

Knowledge-based challenge-responses
Hardware tokens (multiple solution options)
OTP (one time password, limited use)
AVS (not as a stand alone solution)
Signatures
Software token
PINs (online/offline)
User IDs/Passcodes
Two-channel authentication via phone
Biometrics As illustrated above, a variety of mechanisms may be used to authenticate the consumer and the mechanisms may use no user input (e.g., an auto-software security token), limited user input (e.g., the user presses a button), or full user input (e.g., biometrics).

In addition, various "security tokens" may be used to help authenticate the user. A security token is an article or piece of information that can be used to verify real information or data. For example, a PIN may be a security token and may be used to verify the identity of the consumer when the consumer makes a purchase. In another example, a challenge question and corresponding answer may be considered a security token that helps to authenticate the consumer. This latter example is an example of a token having a "bi-directional channel" whereby information flows to the consumer and the consumer sends information back to another party such as an issuer so that the consumer can authenticate himself.

A. Knowledge Based Challenges

In embodiments of the invention, a merchant, a payment processing organization, an issuer, or any other suitable entity may pose challenge questions to the consumer to authenticate the consumer. The challenge questions may be static where the same questions are asked for each purchase transaction or dynamic where different questions may be asked over time.

The questions asked may also have static or dynamic (semi-dynamic or fully dynamic) answers. For example, the question "What is your birthday?" requires a static answer, since the answer does not change. The question "What is your zip-code?" requires a semi-dynamic answer, since it could change or can change infrequently. Lastly, the question "What did you purchase yesterday at 4 pm?" would require a dynamic answer since the answer changes frequently. Thus, in preferred embodiments, the challenge questions would preferably be based on "real time" information that the issuer would most likely possess. For example, the consumer might be asked a more specific question such as "Did you eat out at a Mexican restaurant last night?" By providing more specific knowledge based consumer challenges, the authentication of the consumer is ensured.

In one embodiment, the method includes conducting a transaction such as a purchase transaction using a portable consumer device. The portable consumer device may be a credit card or the like. The purchase transaction may take place at a merchant that has an access device such as a point of sale terminal.

The consumer may use the portable consumer device to interact with an access device such as a point of sale terminal and initiate the process. The point of sale terminal may initiate and then generate an authorization request message, which may thereafter be sent to a payment processing network, and then subsequently to the issuer of the portable consumer device. When the authorization request message is received, by either the payment processing network or the issuer, it is analyzed. A challenge message, which can be dynamic or semi-dynamic in nature, is then generated, and is sent to the consumer. The challenge message could be sent back to the access device, or to the consumer's portable consumer device (e.g., if the portable consumer device is a mobile phone).

The consumer then provides a response to the challenge message. The challenge response message is received from the consumer. The challenge response message is then verified and if it is verified, the authorization response message is analyzed to determine if the transaction is authorized (e.g., there are sufficient funds in the consumer's account or there is sufficient credit in the consumer's account). If the transaction is authorized, the issuer and also the payment processing network send an authorization response message to the consumer. The authorization response message indicates whether or not the transaction is authorized.

In the specific embodiments described above and below, challenge questions are described in detail, but embodiments of the invention are not limited thereto. Embodiments of the invention can generally relate to the use of challenge messages, which may include challenge questions. In some embodiments, as will be described in further detail below, challenge messages may or may not be read by a consumer, and may challenge the authenticity of the consumer in direct or indirect ways. Examples of challenge questions include questions relating to the consumer's portable consumer device (e.g., what is the CVV or card verification value on your card?), the consumer's location (e.g., what is your zip code?), the consumer's mobile or regular phone (e.g., what is your mobile phone number?), the consumer's personal information (e.g., what is your mother's maiden name?), etc. Examples of challenge messages that are not questions that are specifically answered by the consumer include messages which automatically query a phone as to its location or phone number, and cause the retrieval of such information. Another example of a challenge message may be a message which supplies a code (or other authentication token) to a phone, and the use of that code at an access device authenticates the consumer.

B. Systems Using Challenge Messages

Figure 7:
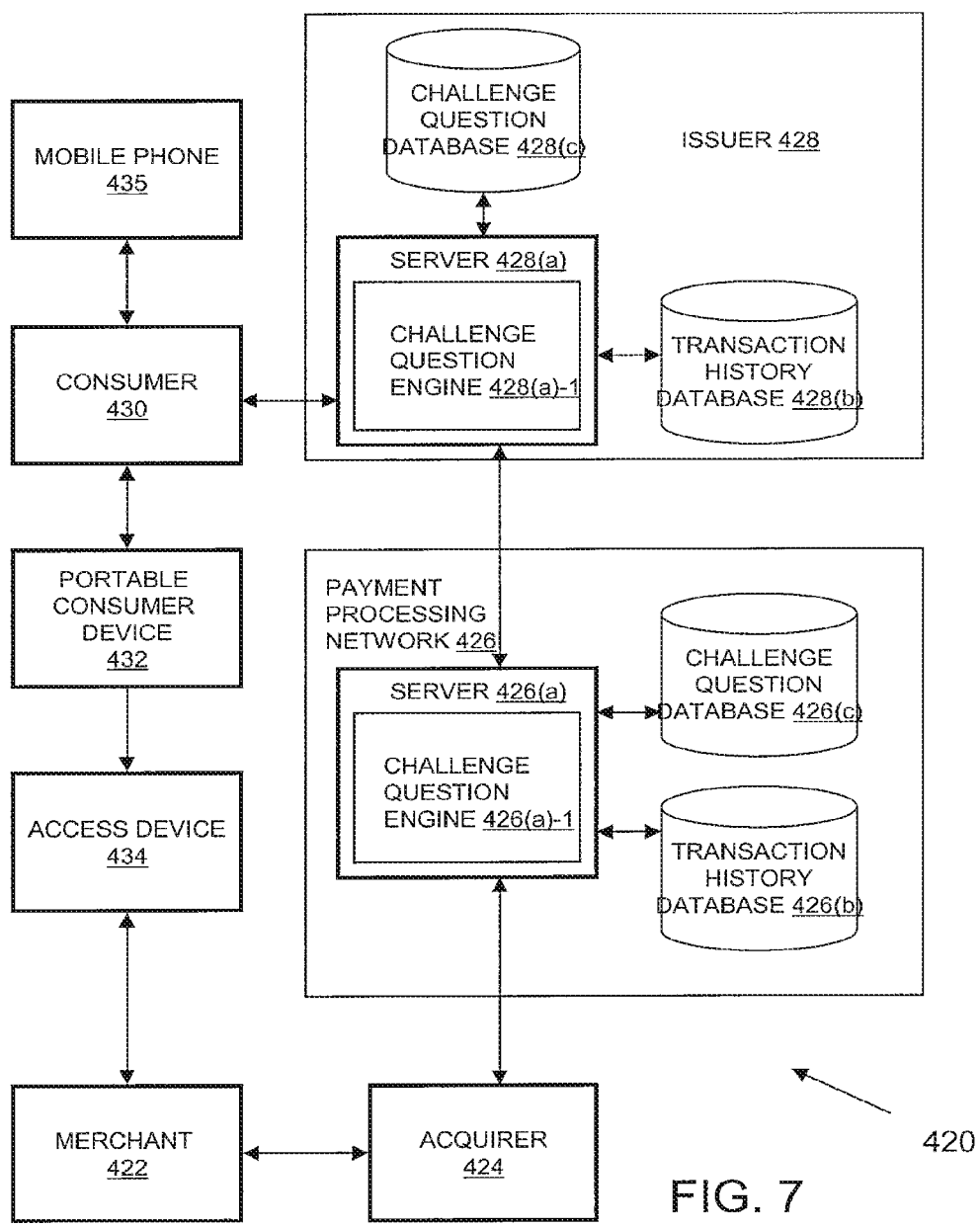
FIG. 7 shows a block diagram of a system comprising a challenge question engine.

FIG. 7 shows an exemplary system 420 according to an embodiment of the invention. Other systems according to other embodiments of the invention may include more or less components than are shown in FIG. 7.

The system 420 shown in FIG. 7 includes a merchant 422 and an acquirer 424 associated with the merchant 422. In a typical payment transaction, a consumer 430 may purchase goods or services at the merchant 422 using a portable consumer device 432. The acquirer 424 can communicate with an issuer 428 via a payment processing network 426.

The consumer 430 may be an individual, or an organization such as a business that is capable of purchasing goods or services. In other embodiments, the consumer 430 may simply be a person who wants to conduct some other type of transaction such as a money transfer transaction. The consumer 430 may optionally operate a wireless phone 435.

The portable consumer device 432 may be in any suitable form. Suitable portable consumer devices are described above in FIG. 1 (e.g., portable consumer device 32).

The payment processing network 426 may be similar to or different than the payment processing network 26 in FIG. 1. As shown in FIG. 7, the payment processing network 426 may comprise a server 426(a), which may comprise a challenge question engine 426(a)-1. The server 426(a) may also be in communication with a transaction history database 426(b) and a challenge question database 426(c). As will be explained in further detail below, the challenge question engine 426(a)-1 may simply extract challenge questions from the challenge question database 426(c). Alternatively or additionally, the challenge question engine 426(a)-1 may generate challenge questions using information in the transaction history database 426(b).

As will be explained in further detail below, the challenge questions may be static or dynamic in nature. For example, the challenge question engine 426(a)-1 may receive an authorization request message, and the authorization request message may include the consumer's account number, as well as the purchase amount. It may then look up the consumer's account number, and any consumer information associated with the consumer's account number. It may thereafter retrieve suitable questions from the challenge question database 426(c) or may generate suitable challenge questions on its own. For instance, in some cases, the challenge question engine 426(a)-1 may retrieve the question "What is your mobile phone number?" from the challenge question database 426(c) after receiving an authorization request message. Alternatively, the challenge question engine 426(a)-1 may generate a dynamic question such as "Did you use this credit card at McDonald's last night?" The information pertaining to the particular restaurant that the consumer 420 was at the preceding day could be retrieved from the transaction history database 426(b).

The challenge question database 426(c) may be populated with questions of any suitable type. The questions may relate to a past location (e.g., the consumer's current home, the city that the consumer recently visited) or current location (e.g., the current location of the store that the consumer is currently at), the type or name of the merchant that the consumer is presently visiting or has visited in the past, the consumer's family or personal data (e.g., name, phone number, social security number, etc.), etc. The questions in the challenge question database 426(c) may be generated by the challenge question engine 426(a)-1 and subsequently stored in the challenge question database 426(c).

Alternatively, or additionally, the challenge questions may be generated from an external source and then subsequently stored in the challenge question database 426(c). For example, the consumer 430 may use a browser on a personal computer or the like to supply specific challenge questions to the server 426(a) via a communication medium (not shown) such as the Internet.

In some embodiments, a consumer may determine the kinds and/or quantity of challenge questions to ask himself or herself. For example, the consumer may specify that the consumer wants to be asked three challenge questions if the consumer visits a jewelry store, but only one question if the consumer visits a fast food restaurant. The types of questions posed by the consumer may be based on the merchant type, frequency of purchasing, etc. Some concepts relating to user-defined authorization parameters are described in U.S. patent application Ser. No. 10/093,002, filed on Mar. 5, 2002, which is herein incorporated by reference in its entirety for all purposes.

In preferred embodiments, the challenge questions are derived from past transaction data in the transaction history database 426(b). The consumer 430 may conduct many transactions with the payment processing network 26 (and/or the issuer 428) over time. This consumer transaction information may be stored in the transaction history database 426(b) over time, and challenge questions may be generated using the transaction information. The past transaction information provides a good basis for authenticating the consumer 430, since the consumer 430 will know about what transactions that the consumer 430 has conducted in the past. For example, the consumer 430 may have used his credit card to pay for a hotel room in New York the previous day, and on the next day may be asked a question such as "Did you stay at a hotel in New York yesterday?" In another example, the consumer 430 may have purchased an item that is more than $2000 the day before, and on the next day may be asked "Did you make a purchase for more than $2000 yesterday?" The questions/answers that are presented to the consumer 430 may be free form in nature and/or may include pre-formatted answers such as multiple choice or true-false answers from which the consumer may select.

The merchant 422 may also have, or may receive communications from, an access device 434 that can interact with the portable consumer device 432. Suitable types of access devices are described above (e.g., access device 34 in FIG. 1).

If the access device 434 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 432.

The issuer 428 may be a bank or other organization that may have an account associated with the consumer 430. The issuer 426 may operate a server 428(a) which may have a challenge question engine 428(a)-1. A transaction history database 426(b) and a challenge question database 428(c) may be in communication with the server 428(a). The issuer server 428(a), challenge question engine 428(a)-1, transaction history database 426(b), and challenge question database 428(c) may operate in the same way or a different way than the payment processing network server 428(a), challenge question engine 428(a)-1, transaction history database 428(b), and challenge question database 428(c). The above-descriptions as to elements 426(a), 426(a)-1, 426(b), and 426(c) may apply to elements 428(a), 428(a)-1, 428(b), and 428(c).

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

C. Methods Using Challenge Messages

Methods according to embodiments of the invention can be described with reference to FIGS. 7 and 8. In a typical purchase transaction, the consumer 430 purchases a good or service at the merchant 422 using a portable consumer device 432 such as a credit card. The consumer's portable consumer device 432 can interact with an access device 434 such as a POS (point of sale) terminal at the merchant 422 (step 502). For example, the consumer 430 may take a credit card and may swipe it through an appropriate slot in the POS terminal. Alternatively, the POS terminal may be a contactless reader, and the portable consumer device 432 may be a contactless device such as a contactless card.

A first authorization request message is then forwarded to the acquirer 424. After the acquirer 424 receives the first authorization request message, the first authorization request message is then sent to the payment processing network 426 (step 504). The first authorization request message is then received at the payment processing network server 426(a) and the payment processing network server 426(a) then determines if a challenge is needed.

Various criteria may be used to determine if a challenge is needed. For example, the payment processing network server 426(a) may determine that the particular transaction is a high value transaction (e.g., greater than $1000) and that a challenge is therefore appropriate. In another example, the payment processing network server 426(a) may determine that there is something suspicious about the present transaction and may thereafter determine that a challenge is appropriate. For example, the payment processing network server 426(a) may determine that the portable consumer device 432 is currently being used at a location which is different from the consumer's home state, and the consumer's recent purchase history suggests that the consumer is not traveling.

Once it has been determined that a challenge is appropriate for the present transaction, the challenge question engine 426(a)-1 may then fetch (local or remote) a challenge question (step 508). In some embodiments, the challenge question engine 426(a)-1 may retrieve the question from the challenge question database 426(c).

At this point, rather than sending the first authorization request message to the issuer 426, the payment processing network 426 sends a first authorization response message back to the access device 434 via the merchant 422 and the acquirer 424 (step 510). The first authorization response message may contain data representing the challenge request that was previously obtained by the challenge question engine 426(a)-1. The first authorization response message may be characterized as an initial decline, since it does not indicate approval of the transaction.

Once the challenge question is received at the access device 434, the consumer 430 supplies the challenge response to the access device 434. The challenge response may be supplied to the access device 434 in any suitable manner (e.g., through a keypad, contactless reader, etc.). Once the access device 434 receives the challenge response, the access device 434 then forwards the challenge response to the payment processing network server 426(a) via the merchant 422 and the acquirer 424, and it is received by them (step 512). The challenge response message may be part of a second authorization request message.

The payment processing network server 426(a) then validates the challenge response message (step 514). If the challenge response message is not validated, then the payment processing network server 426(a) may send a response message back to the access device 434 indicating that that transaction is not approved. Alternatively or additionally, the payment processing network server 426(a) may send another challenge question to the access device 434. On other hand, if the challenge is validated, the payment processing network server 426(a) may send the second authorization request message to the issuer 428 (step 516) along with an indication that the consumer 430 has satisfied any challenges posed by the payment processing network 426.

After the issuer 428 receives the second authorization request, the issuer 428, using the issuer server 428(a), determines if the transaction is authorized or is not authorized (step 518). The transaction may not be authorized because the consumer 430 has insufficient funds or credit. If the consumer 430 does have sufficient funds or credit, the issuer 428 may then send a second authorization response message indicating that the transaction is authorized back to the access device 434 via the payment processing network 426, the acquirer 424, and the merchant 422 (step 522).

At the end of the day, a normal clearing and settlement process can be conducted by the payment processing network 426. A clearing process is a process of exchanging financial details between and acquirer and an issuer to facilitate posting to a consumer's account and reconciliation of the consumer's settlement position. Clearing and settlement can occur simultaneously.

A number of alternative embodiments are also possible. For example, the issuer 428 could generate challenge questions and send them to the consumer 430 instead of or in addition to the payment processing network 426. The challenge question engine 428(a)-1, the transaction history database 428(b), and the challenge question database 426(c) operated by the issuer 428 may be used in the same or different way as the above-described challenge question engine 426(a)-1, the transaction history database 426(b), and the challenge question database 426(c) operated by the payment processing network 426.

In the above-described embodiments, there are two authorization request messages that are sent to the payment processing network 426 (and/or the issuer 428). This is desirable, since existing payment processing systems have "timers" that are set at various points between the access device 434 and the issuer 428 during a payment authorization process. The timers time how long various events should take place during the payment authorization process. The timers may be set and embodied as computer code at the acquirer 424, the payment processing network 426, and the issuer 428. For example, the timers at the acquirer 424, payment processing network 426, and issuer 428 may be respectively set to 3 seconds, 6 seconds, and 10 seconds. If an authorization request message is not received within these respective times, then some event may be triggered. For instance, an error message may be sent back to the access device 434 requesting that the merchant 422 resubmit the authorization request message, if an authorization request message is not received at the issuer 428 within 10 seconds. If a challenge request is created during the authorization process and before the authorization request message reaches the issuer 428, the issuer's timer may trigger an event indicating that an error has occurred. Creating challenge requests and responses during a single authorization process could potentially conflict with pre-existing timers in a payment system.

By using at least two authorization request messages in two separate authorization processes, the above-described timers are advantageously not affected. The timers need not be changed to send challenge questions to the consumer 430. This allows embodiments of the invention to be used with an existing payments infrastructure and widespread changes are not needed in embodiments of the invention. In comparison, if the retrieval of a challenge question during a payment authorization process occurs using a single authorization request message, this may delay the authorization request message and may necessitate changes in timers present in a payment processing system.

The at least two authorization request messages may have information such as BINs (bank identification numbers), transaction amounts, account numbers, service codes, etc. They may also contain the same transaction amount for the transaction being conducted, and/or different transaction amounts. For example, the first authorization request message may have the actual transaction amount, and the second authorization request message may have a zero dollar amount or other identifier to indicate that that prior authentication request with a transaction amount has already been submitted. A transaction code may be used to link the first and second authorization requests in some embodiments.

Figure 8:
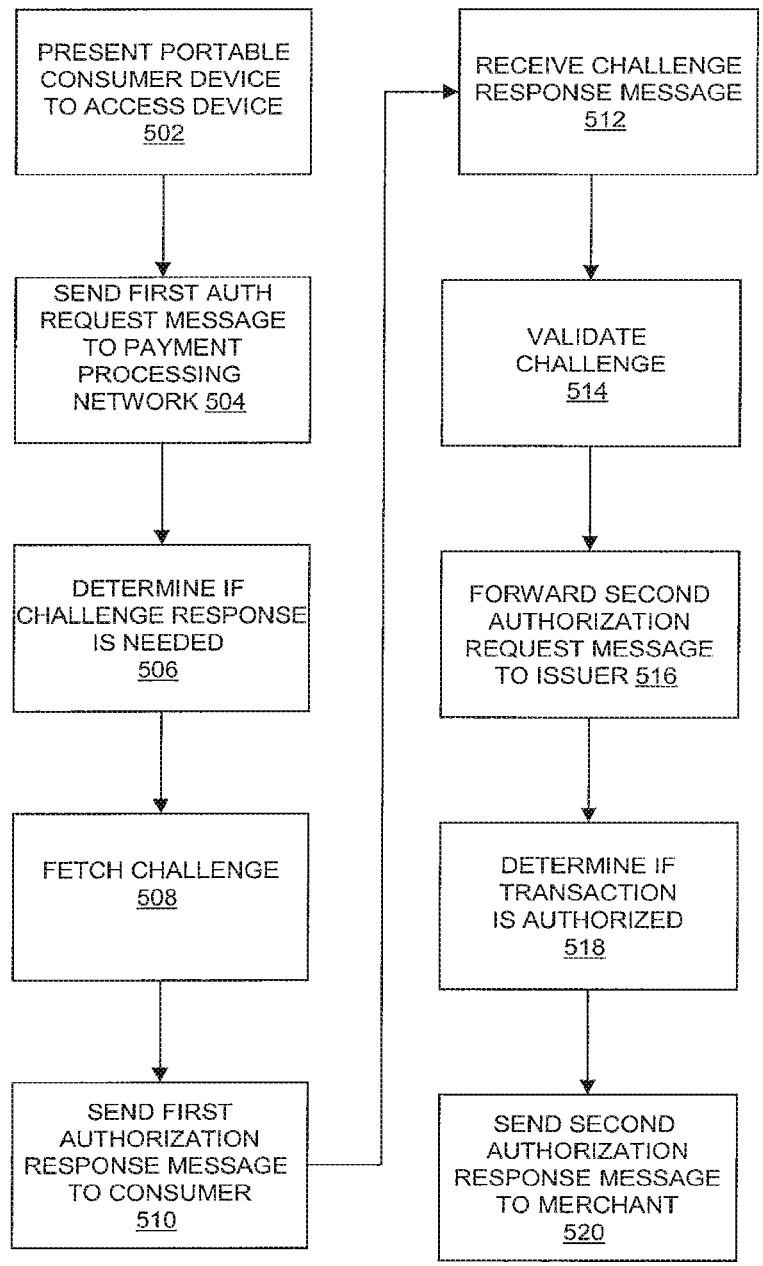
FIGS. 8-9 show flowcharts illustrating methods comprising using a challenge message to authenticate a consumer.

The method described with respect to FIG. 8 can be characterized as a "closed channel" process since the access device 434 receives a challenge question and provides a response to the challenge question. However, other embodiments of the invention may use open channel solutions whereby a challenge question may be sent to a device other than the access device which sent the first authorization response message.

Figure 9:
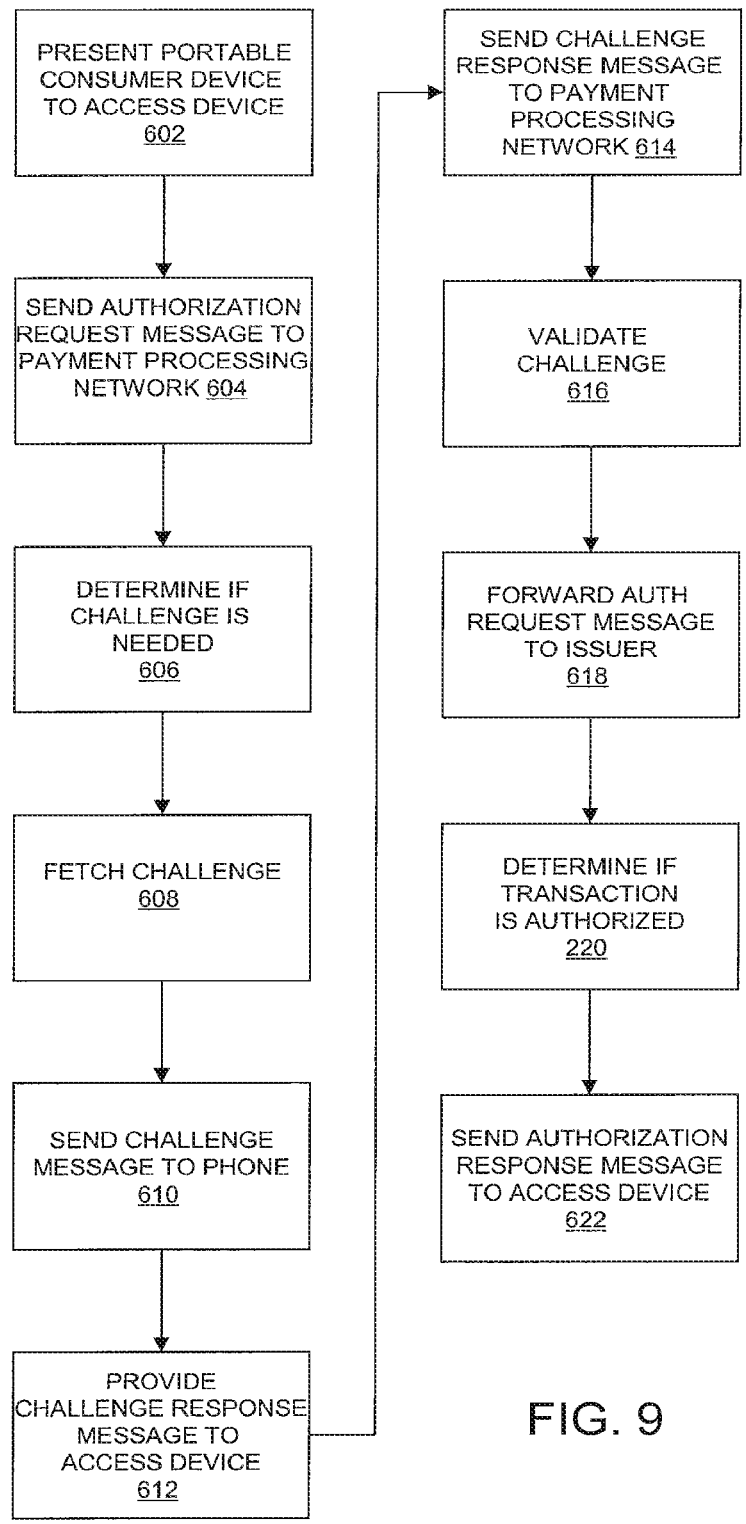

Examples of open channel methods according to embodiments of the invention can be described with reference to FIGS. 7 and 9. In a typical purchase transaction, the consumer 430 purchases a good or service at the merchant 422 using a portable consumer device 432 such as a credit card. The consumer's portable consumer device 432 can interact with an access device 434 such as a POS (point of sale) terminal at the merchant 422 (step 602). For example, the consumer 30 may take a credit card and may swipe it through an appropriate slot in the POS terminal. Alternatively, the POS terminal may be a contactless reader, and the portable consumer device 432 may be a contactless device such as a contactless card.

A first authorization request message is then forwarded to the acquirer 424. After receiving the first authorization request message, the first authorization request message is then sent to the payment processing network 426 (step 604). The first authorization request message is received at the payment processing network server 26(a) and the payment processing network server 426(a) then determines if a challenge is needed.

Various criteria may be used to determine if a challenge is needed. For example, the payment processing network server 426(a) may determine that the particular transaction is a high value transaction (e.g., greater than $1000) and that a challenge is therefore appropriate. In another example, the payment processing network server 426(a) may determine that there is something suspicious about the present transaction and may thereafter determine that a challenge is appropriate.

Once it has been determined that a challenge is appropriate for the present transaction, the challenge question engine 426(a)-1 may then fetch (local or remote) a challenge question (step 608). In some embodiments, the challenge question engine 426(a)-1 may retrieve the question from the challenge question database 426(c).

Rather than sending the first authorization request message to the issuer 426, and rather than sending a first authorization response message back to the access device 434, the payment processing network 426 sends a first authorization response message back to the consumer's mobile phone 435 (step 610) or other type of access device. The first authorization response message may be sent back to the consumer's mobile phone 435. This can be done directly or through some intermediate entity. The first authorization response message may contain data representing the challenge request that we previously obtained by the challenge question engine 426(a)-1. The first authorization response message may be characterized as an initial decline, since it does not indicate approval of the transaction.

Once the challenge question is received at the mobile phone 435, the consumer 430 supplies the challenge response to the access device 434 (step 612) The access device 434 then forwards the challenge response to the payment processing network server 426(a) via the merchant 422 and the acquirer 424, and it is received by them (step 614). The challenge response message may be part of a second authorization response message.

Note that although challenge questions that the consumer actively answers are described in detail, other types of challenge requests may be sent to the mobile phone 435. For example, in some cases, the challenge requests may not require an answer that is actively provided by the consumer 430. Passive answers to challenge requests may be provided. For example, in some embodiments, the challenge request supplied to the mobile phone 435 may be a query regarding the physical location of the mobile phone 435. The mobile phone 435 may have a GPS device or other location device and this information (or a cryptogram, etc.) may be transmitted to the payment processing network 426, and the payment processing network 426 may authenticate the consumer 434 using this location information.

Once the payment processing network server 426(a) receives the challenge response message, the payment processing network server 426(a) then validates the challenge response message (step 616). If the challenge response message is not validated, then the payment processing network server 426(a) may send a response message back to the access device 434 indicating that that transaction is not approved. Alternatively or additionally, the payment processing network server 426(a) may send another challenge message to the access device 434 and/or the mobile phone 435. On other hand, if the challenge is validated, the payment processing network server 426(a) may then send the second authorization request message to the issuer 428 (step 618) along with an indication that the consumer 430 has satisfied any challenges posed by the payment processing network 426.

After the issuer 428 receives the second authorization request, the issuer 428 using the issuer server 428(a) determines if the transaction is authorized or is not authorized (step 620). The transaction may not be authorized because the consumer 430 has insufficient funds or credit. If the consumer 430 does have sufficient funds or credit, the issuer 428 may then send a second authorization response message indicating that the transaction is authorized back to the access device 434 via the payment processing network 426, the acquirer 424, and the merchant 422 (step 622).

At the end of the day, a normal clearing and settlement process can be conducted by the payment processing network 426. A clearing process is a process of exchanging financial details between and acquirer and an issuer to facilitate posting to a consumer's account and reconciliation of the consumer's settlement position. Clearing and settlement can occur simultaneously.

A number of alternative embodiments are also possible. For example, the issuer 428 could generate challenge questions and send them to the mobile phone 435 instead of or in addition to the payment processing network 426. The challenge question engine 428(b)-1, the transaction history database 428(b), and the challenge question database 426(c) operated by the issuer 428 may be used in the same or different way as the above-described challenge question engine 426(a)-1, the transaction history database 426(b), and the challenge question database 426(c) operated by the payment processing network 426.

In another embodiment, instead of sending a challenge question to the payment processing network server 426(a) may send an electronic coupon to the consumer's mobile phone 435. The payment processing network 426 may determine that a challenge is appropriate and may send the electronic coupon to the phone 435. Upon receipt of this electronic coupon, the consumer may then be prompted to use the coupon at the access device 434. If the consumer 430 uses the coupon at the access device 434, then access device 434 forwards the coupon to the payment processing network 426, and receipt of the coupon by the payment processing network 426 indicates that the consumer 430 is authenticated. It is presumed that the consumer 430 is authentic since a non-authentic consumer would not be in possession of the consumer's phone 435.

Further details regarding embodiments that use challenges are described in U.S. patent application Ser. No. 11/763,240, entitled Consumer Authentication System and Method, filed on Jun. 14, 2007 which is herein incorporated by reference in its entirety for all purposes.

VII. Other Transaction Authentication Techniques

A. Methods Using Algorithm Identifiers

In embodiments of the invention, a payment processing organization or other entity may support different security technologies offered by different companies. The different security technologies may use portable consumer device fingerprints. For example, two magnetic stripes on two payment cards can store identical consumer data (e.g., account number information), but the magnetic structures of the two magnetic stripes may be different. A specific magnetic structure may be an example of a fingerprint or "DNA" that is associated with a payment card. If a thief copied the consumer data stored on a magnetic stripe to an unauthorized credit card, the magnetic stripe of the unauthorized credit card would have a different magnetic structure or fingerprint than the authorized credit card. A back end server computer receiving the authorization request message in response to the unauthorized card's use would determine that the unauthorized credit card is not real, because the fingerprint is not present in the authorization request message. Two companies that offer this type of technology are Magtek™ and Semtek™. Each company uses its own proprietary algorithm in a point of sale terminal to alter (e.g., encrypt) its own fingerprint before it is sent to an issuer or other entity in a subsequent authentication process.

In embodiments of the invention, a portable consumer device fingerprint may include any suitable identification mechanism that allows one to identify the portable consumer device, independent of static consumer data such as an account number or expiration date associated with the portable consumer device. Typically, unlike consumer data, portable consumer device fingerprint data is not known to the consumer. For instance, in some embodiments, the fingerprint data may relate to characteristics of the materials from which the portable consumer devices are made. For example, as noted above, a portable consumer device fingerprint can be embedded within the particular microscopic structure of the magnetic particles in the magnetic stripe in a payment card. In some cases, no two magnetic stripes will have same portable consumer device fingerprint.

Portable consumer device fingerprints can take other forms. For example, another card verification technology comes from a company called QSecure™. The technology offered by QSecure™ uses a dynamic CVV (card verification value) that can be generated by a chip in a payment card (the chip may be under a magnetic stripe and can write the dynamic CVV or a number related to the dynamic CVV to the magnetic stripe). In this case, the dynamic CVV may act as a portable consumer device fingerprint identifying the particular portable consumer device. The dynamic CVV may be sent to a point of sale device during a payment transaction. A specific algorithm in the point of sale device may alter (e.g., encrypt) the dynamic CVV before it is sent to the issuer of the payment card for authorization. The issuer, payment processing organization, or other entity, may receive the altered dynamic CVV and may restore it to its original form. The dynamic CVV can then be checked by the back end server computer to see if it corresponds to an independently derived dynamic CVV, thereby authenticating the portable consumer device. In this example, the dynamic CVV value could also be considered a portable consumer device fingerprint, even though it is dynamic in nature.

Embodiments of the invention allow for many different types of portable consumer device fingerprinting systems to be used together in a single payment processing system. In embodiments of the invention, a different identifier or ID is assigned to each type of algorithm in each type of POS terminal. For example, a back end entity such as an issuer or a payment processing organization might use algorithm identifiers like those in Table 1 below.

TABLE 1

| Algorithm Identifier | Description of Algorithm |
| --- | --- |
| 01 | Company A magnetic stripe fingerprint encryption algorithm |
| 02 | Company B magnetic stripe fingerprint encryption algorithm |
| 03 | Company C dynamic CVV encryption algorithm |

As shown in Table 1, the algorithm ID may take any suitable form. For example, the algorithm IDs may simply be one, two, or three digit numbers.

When the POS terminal sends an authorization request message to an issuer, the authorization request message may contain the particular algorithm ID associated with the POS terminal and an altered portable consumer device fingerprint. When the authorization request message is received by a back end server computer, it can determine which algorithm was used to encrypt the portable consumer device fingerprint. The back end server computer may then decrypt the encrypted portable consumer device fingerprint and may determine if the portable consumer device fingerprint corresponds to the portable consumer device fingerprint that is stored in a back end database. The portable consumer device fingerprint may have been previously stored in the back end database along with corresponding consumer data (e.g., an account number) as part of the process of issuing the portable consumer device to the consumer who will use it.

Using such algorithm identifiers, embodiments of the invention can effectively integrate different technologies into a single payment processing system. For example, a consumer can swipe a payment card through a POS (point of sale) terminal to pay $5.00 for office supplies. The POS terminal may contain an encryption algorithm produced by Company A. The encryption algorithm may encrypt a fingerprint that is embedded in the magnetic structure of the magnetic stripe of the payment card. The POS terminal may then send an authorization request message to a back end server computer. The authorization request message may contain information including the purchase amount, consumer data such as the consumer's account number, the encrypted fingerprint, and an algorithm identifier that is specifically associated with the encryption algorithm produced by company A. The back end server computer can receive the authorization request message from a POS (point of sale) terminal. It can then determine which algorithm was used to encrypt the fingerprint, and can subsequently decrypt the fingerprint. Once the fingerprint is determined, the back end server computer can determine if the received fingerprint corresponds to the stored fingerprint. If it does, then the payment card is authenticated.

Other details regarding methods and systems that utilize algorithm identifiers are provided below.

B. Confidence Assessment Methods

In some embodiments, the back end processor, or back end server computer, can also determine whether a transaction meets a desired confidence threshold of likely validity before it determines that a portable consumer device is authenticated. If the confidence threshold is not met, additional authentication processes can be performed. Such additional authentication processes may include the sending of one or more challenge questions and/or notification messages to the consumer.

Illustratively, a back end server computer may receive an authorization request message from a POS terminal after a consumer tries to pay for office supplies using a payment card. The back end server computer may determine that one of the three card verification technologies in Table I above is present, and that there have not been any recent suspicious transactions associated the payment card. The back end server computer may thereafter determine that the transaction is valid (i.e., a confidence threshold has been met) and can proceed if the transaction is otherwise authorized by the issuer of the payment card. Conversely, if an old (legacy) card and reader are used to conduct the transaction, none of the three card protection technologies in Table 1 (above) is used, and there has been recent suspicious activity associated with the payment card, then the server computer may determine that a confidence threshold has not been met, and additional authentication processes can be initiated by the server computer. For example, a dynamic challenge (query) can be sent to the consumer before approval, and/or the consumer can be notified that a transaction is occurring.

Transaction confidence determinations can also take into account whether one algorithm could be more reliable than the other. The back end server computer can evaluate the algorithm that was used at the front end (e.g., at the POS terminal) and can determine whether or not the transaction should proceed. For example, the back end server computer may determine that the algorithm from company A may have 90% reliability and the algorithm from Company B may have 50% reliability.

There are a number of reasons why different algorithms may have different levels of reliability. For example, depending on the sensitivity of the terminal, depending on the way that the card is swiped, and depending on the aging of the card, some algorithms may be able to handle data more precisely. In this example, if the server computer receives an authorization request message indicating that the algorithm from Company B is present and there has been recent suspicious activity associated with the payment card, then additional authentication processing may be initiated. On the other hand, if the server computer receives an authorization request message indicating that the algorithm from Company A is present and there has been recent suspicious activity, then the back end server computer may not initiate additional authentication processing.

Illustratively, McDonalds may have a relationship with Company A and Taco Bell may have a relationship with Company B. They have may use different algorithms at their point of sale devices. Each one delivers two sets of data using two different algorithms. When they come back to a payment processing organization such as Visa, it may identify data as originating from a Company A algorithm, and/or from Company B algorithm. Weight can be put on the algorithms so that a confidence level can be determined. Additional authentication processing may then take place if a confidence level (or threshold) is not satisfied.

C. Exemplary Systems Using Algorithm Identifiers and Confidence Assessment

Figure 10A:
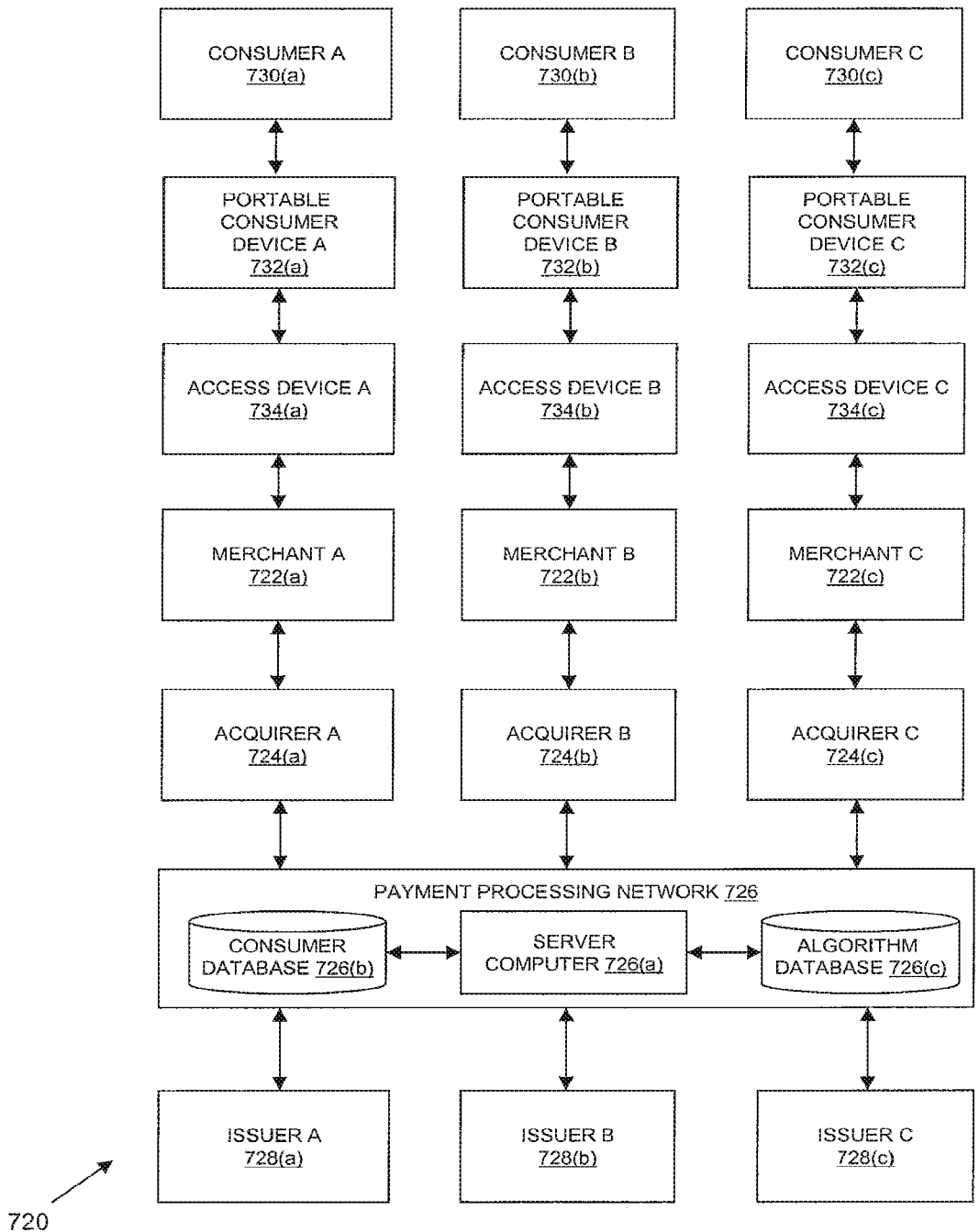
FIG. 10(a) shows a block diagram of a system that can use an algorithm ID.

FIG. 10(a) shows a system 720 that can be used in an embodiment of the invention. The system 720 includes a plurality of merchants 722(a), 722(b), 722(c) and a plurality of acquirers 724(a), 724(b), 724(c) associated with the merchants 722(a), 722(b), 722(c). In typical payment transactions, consumers 730(a), 730(b), 730(c) may purchase goods or services at the merchants 722(a), 722(b), 722(c) using their portable consumer devices 732(a), 732(b), 732(c). The consumers 730(a), 730(b), 730(c) may individuals, or organizations such as businesses. The acquirers 724(a), 724(b), 724(c) can communicate with the issuers 728(a), 728(b), 728(c) via a payment processing network 726. The issuers 728(a), 728(b), 728(c) may respectively issue portable consumer devices 730(a), 730(b), 730(c) to the consumers 730(a), 730(b), 730(c).

For purposes of illustration, access device A 732(a) may be produced by Company A, which may be associated with an algorithm with an algorithm identifier "01". Access device B 732(b) may be produced by Company B and may be associated with an algorithm with an algorithm identifier "02". Access device C 732(c) may be associated with Company D and may have no algorithm associated with it.

The portable consumer devices 732(a), 732(b), 732(c) may be in any suitable form. For example, suitable portable consumer devices 732(a), 732(b), 732(c) can be hand-held and compact so that they can fit into a consumer's wallet and/or pocket (e.g., pocket-sized). Suitable portable consumer devices are described above (e.g., portable consumer device 32 in FIG. 1).

The merchants 722(a), 722(b), 722(c) may also have, or may receive communications from, respective access devices 734(a), 734(b), 734(c) that can interact with the portable consumer devices 732(a), 732(b), 732(c). Suitable types of access devices are described above (e.g., access device 34 in FIG. 1).

If the access device is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 732(*a*), 732(*b*), 732(*c*).

The payment processing network 726 may include any of the characteristics described above (e.g., with respect to payment processing network 26 in FIG. 1). It may include a server computer 726(*a*).

Figure 10B:
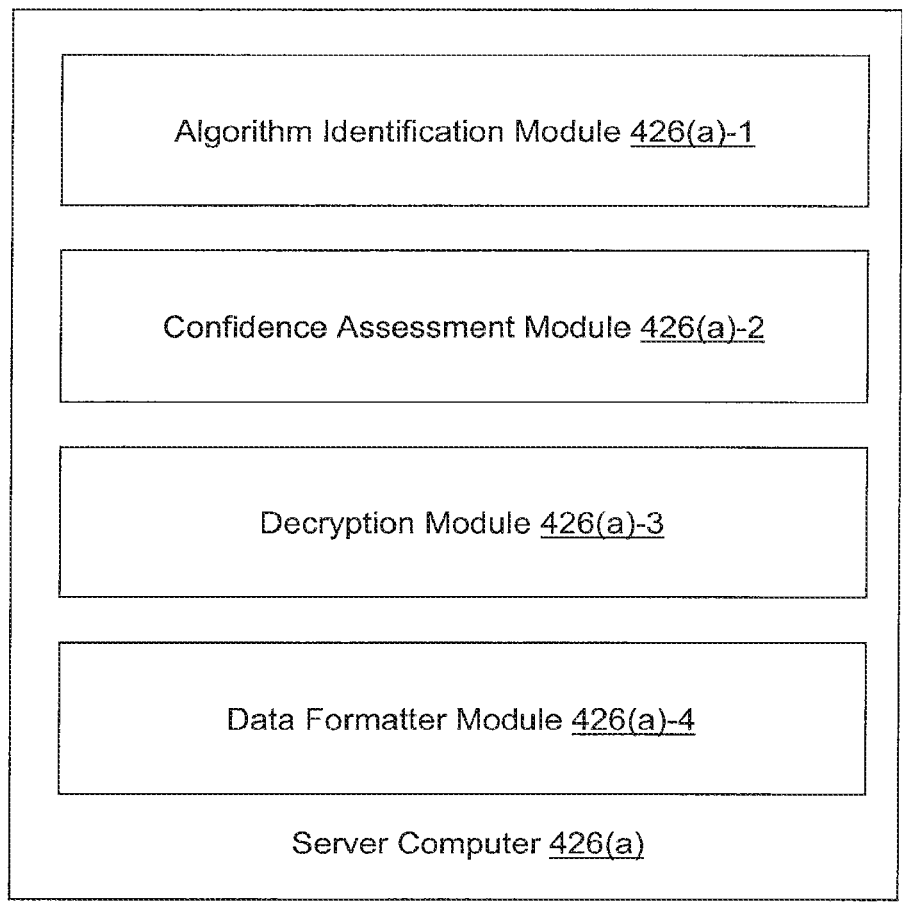
FIG. 10(b) shows a block diagram showing modules that may be present in a server computer in the system in FIG. 10(a).

The server computer 726(*a*) may comprise any suitable number of software modules and they may be of any suitable type. As shown in FIG. 10(*b*), the server computer 726(*a*) may comprise an algorithm identification module 726(*a*)-1 and a confidence assessment module 726(*a*)-2. It may also comprise a decryption module 726(*a*)-3, as well as a data formatter module 726(*a*)-4.

The algorithm identification module 726(*a*)-1, in conjunction with the decryption module 726(*a*)-3, may review a received authorization request message including an algorithm ID and an altered portable consumer device fingerprint. From the received algorithm ID, it may then determine which algorithm was used to alter (e.g., encrypt) the portable consumer device fingerprint. A lookup table or the like may be used to identify correspondence between the algorithm ID, the algorithm(s) used to alter a portable consumer device fingerprint or restore an altered portable consumer device fingerprint, and consumer data (e.g., an account number). (In some cases, the algorithm may be a key in an encryption process.) The server computer 726(*a*) may then be used to determine (e.g., by unencrypting) the portable consumer device fingerprint from the altered portable consumer device fingerprint in an authorization request message. Once the portable consumer device fingerprint is determined, this information may be analyzed to determine if it corresponds to a stored fingerprint linked to consumer data (e.g., account number) associated with the portable consumer device.

The confidence assessment module 726(*a*)-2 may generate a confidence assessment from various pieces of information. Such information may include the type of portable consumer device used (e.g., a phone may be more secure than a payment card), the type of algorithm used to encrypt the portable consumer device fingerprint (e.g., some encryption algorithms are more secure than others), etc. Using the confidence module 726(*a*)-2, the server computer 726(*a*) may subsequently determine if additional authentication processes need to take place. Such additional authentication processes may comprise challenge questions and/or consumer notification that a transaction is occurring.

The confidence assessment module 726(*a*)-2 can "score" a transaction based on a number of transaction variables. If this score exceeds a predetermined threshold, then the transaction can be considered valid and additional authentication processing need not take place. Conversely, if the score does not exceed a predetermined threshold, then the transaction may be characterized as suspicious and additional authentication processes may be initiated.

The data formatter module 726(*a*)-4 may be used to format data so that it can be used by the confidence assessment module 726(*a*)-2. In some cases, data that is from different POS terminals from different companies may be decrypted by the decryption module 726(*a*)-3 and may be in different formats. The data formatter can format any data so that it can be used by the confidence assessment module 726(*a*)-2.

Embodiments of the invention are not limited to the above-described embodiments. For example, although separate functional blocks are shown for an issuer, payment processing network, and acquirer, some entities perform all of these functions and may be included in embodiments of invention.

D. Exemplary Methods for Using Fingerprints and Identifiers

Figure 11:
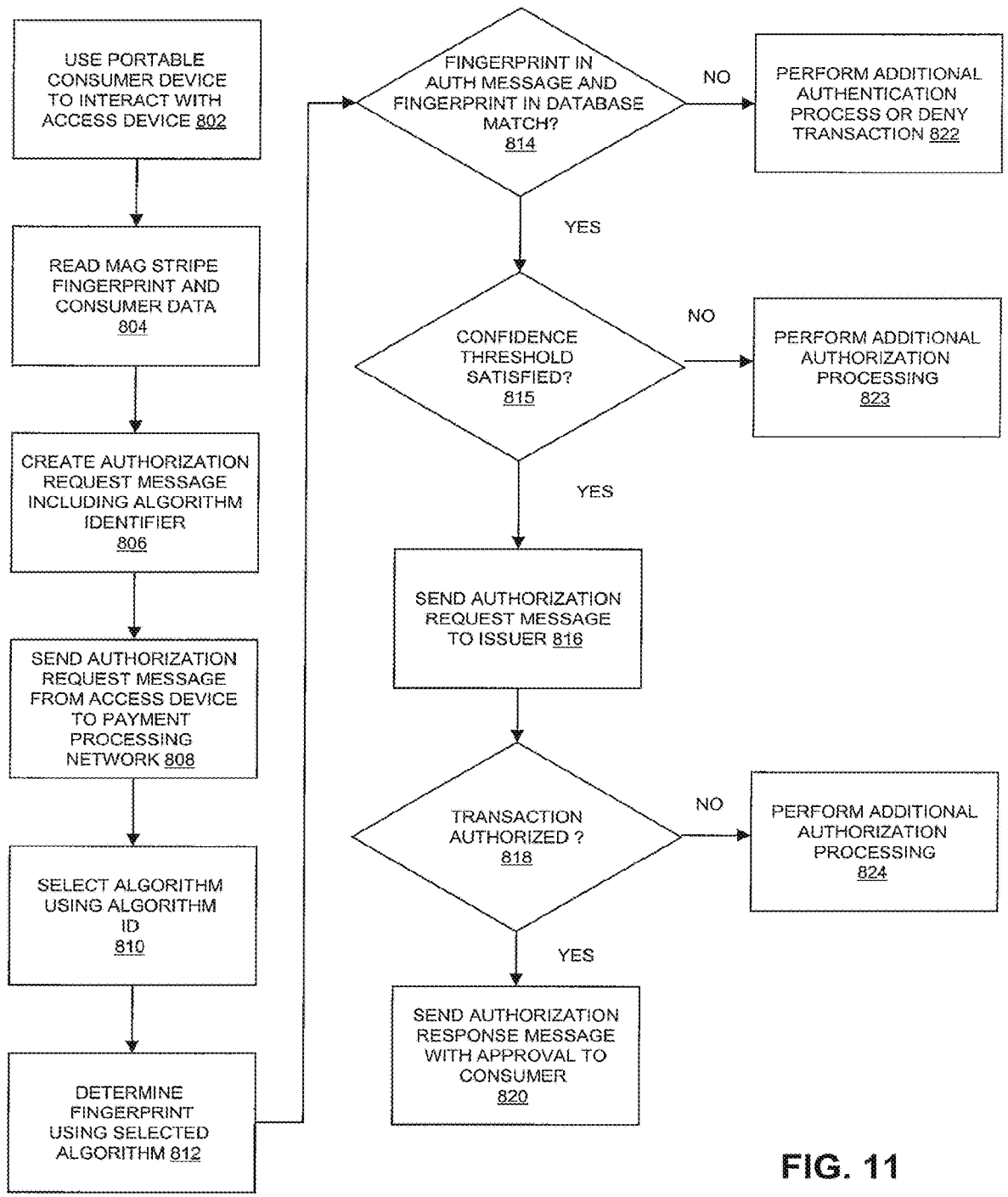
FIGS. 11-12 show flowcharts illustrating methods according to embodiments of the invention.
Figure 12:
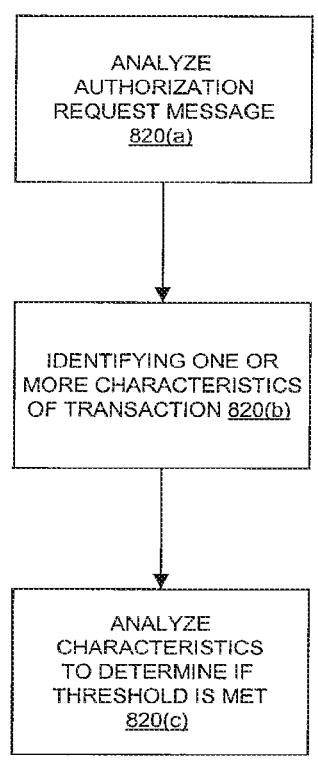

Various methods according to embodiments of the invention may be described with reference to FIGS. 10-12. FIGS. 11-12 include flowcharts.

Some or all of the steps shown in FIG. 11 may be included in embodiments of the invention. For example, some embodiments of the invention may use algorithm identifiers to determine if a portable consumer device fingerprint in an authorization request message matches a portable consumer device fingerprint stored in a back end database, and may not perform transaction confidence processing before determining if the transaction is authorized. In other embodiments, a transaction confidence process may be performed without using portable consumer device fingerprints to authenticate portable consumer devices. In preferred embodiments, however, algorithm identifiers, portable consumer device fingerprints, and transaction confidence processing are used to authenticate the portable consumer devices and transactions as a whole.

Also, while the flowcharts shown in FIGS. 11 and 12 shows specific steps being performed in a specific order, embodiments of the invention can include methods which include such steps in a different order. This also applies to other flowcharts or processes described in this application.

Referring to FIGS. 10(*a*) and 11, a consumer A 730(*a*) may use a portable consumer device A 732(*a*) to interact with an access device A 734(*a*) at a merchant A 732(*a*) (step 802). For example, the portable consumer device 732(*a*) may be a credit card, the access device A 734(*a*) may be a point of sale terminal, and the merchant A 732(*a*) may be a gas station. Consumer A 730(*a*) may want to purchase gas from merchant A 722(*a*) using the portable consumer device A 732(*a*).

After the portable consumer device A 732(*a*) interfaces with the access device A 734(*a*) at merchant A 722(*a*), the access device A 734(*a*) reads consumer data and portable consumer device fingerprint data such as magnetic stripe fingerprint data from the portable consumer device A 732(*a*) (step 804). The consumer data may include information of which the consumer is typical aware. Examples of consumer data include a consumer's account number, expiration date, and service code. As noted above, portable consumer device fingerprint data are data that are not typically known to the consumer, but are used to authenticate the portable consumer device. In this example, the portable consumer device fingerprint data may be magnetic stripe fingerprint data. The magnetic stripe fingerprint data may also comprise data that are embedded into the magnetic structure of the magnetic stripe and are only readable using an access device that is manufactured by a particular company.

Once the access device A 734(*a*) obtains the consumer data from the portable consumer device A 734(*a*), an authorization request message including an algorithm identifier is created (step 806). The authorization request message may also include consumer data (e.g., an account number), data relating to the amount of the purchase, and portable consumer device fingerprint data. The access device A 734(*a*) may alter (e.g., encrypt) the received fingerprint data using an algorithm A that is stored in a memory in access device A 734(*a*), before it is incorporated into the authorization request message. In some embodiments, the portable consumer device fingerprint and the algorithm identifier may be stored in a supplementary data field called Field 55.

Different types and sizes of fingerprints may originate from different portable consumer devices offered by different manufacturers. These different fingerprints may be inserted into a data field of standard size so that transmission through the payment processing system is uniform regardless of the particular fingerprint being transmitted. For example, in some cases, it is desirable to pad the data field with characters such as zeros to fill up the data field. For example, a data field may have a size of 64 bytes. The fingerprint from one type of portable consumer device may be 54 bytes while the fingerprint from another type of portable consumer device may be 56 bytes. Additional padding characters may be present in the 64 byte field along with a two character algorithm identifier. The padding characters may be placed in the field in a predetermined manner.

In embodiments of the invention, the previously described algorithm identifier may not only identify the algorithm used to encrypt a portable consumer device fingerprint; the identified algorithm can also be used to restore the fingerprint to its original form so that it can be evaluated. For example, the algorithm identifier may be used to identify the algorithm that may be used to remove any padding characters to restore the received, but altered fingerprint to its original form so that it can be evaluated.

The authorization request message is then sent from access device 734(*a*) to the payment processing network 726 via the acquirer A 724(*a*) associated with the merchant A 722(*a*) (step 808). In other embodiments, the access device 734(*a*) could send the authorization request message to the payment processing network directly, instead of through the acquirer A 724(*a*).

After the authorization request message is received by the payment processing network 726, the server computer 726(*a*) in the payment processing network 726 analyzes the authorization request message and then selects an algorithm using an algorithm ID that is in the authorization request message (step 810). The selected algorithm ID and the selected algorithm may be selected from the algorithm database 726(*c*). The algorithm database 726(*c*) may contain a plurality of algorithm IDs and a plurality of algorithms which may be associated with various access devices (e.g., access device A 732(*a*) and access device B 734(*b*)).

After the algorithm is identified, the portable consumer device fingerprint is determined by the server computer 726(*a*) in the payment processing network 726 (step 812). The selected algorithm is then used to restore (e.g., decrypt) the altered portable consumer device fingerprint present in the authorization request message.

Then, the server computer 726(*a*) determines if the determined portable consumer device fingerprint corresponds to a previously stored fingerprint in a database (step 814). The server computer 726(*a*) can first obtain consumer data such as the consumer's account number from the authorization request message and/or may obtain additional consumer data from the consumer database 726(*b*) after analyzing the authorization request message. Once the consumer data are determined, the server computer 726(*a*) can obtain the portable consumer device fingerprint from the consumer database 726(*b*). The server computer 726(*a*) then determines if the portable consumer device fingerprint in the authorization request message and the portable consumer device fingerprint in the consumer database 726(*b*) match.

If the portable consumer device fingerprint obtained from the consumer database 726(*b*) does not correspond to the previously restored portable consumer device fingerprint obtained from the authorization request message, then additional authentication processes may be performed and/or an authorization response message may be sent back to the consumer A 722(*a*) indicating that the transaction is denied (step 822). Additional authentication processing may include sending a transaction notification message to the consumer A 722(*a*) (e.g., to the consumer's cell phone or the consumer's computer) notifying the consumer that a transaction is taking place. The notification message may request that the consumer A 722(*a*) confirm that the transaction is authentic. Alternatively or additionally, other types of challenges, such as challenge questions, may be sent to consumer A 722(*a*). Challenges such as challenge questions are described in further detail in U.S. patent application Ser. No. 11/763,240, entitled "Consumer Authentication System and Method" filed on Jun. 14, 2007, which is herein incorporated by reference in its entirety for all purposes.

In some embodiments, if a fingerprint obtained from the authorization request message and the fingerprint in the consumer database 726(*b*) match, the server computer 726(*a*) may also optionally determine if a transaction confidence threshold is satisfied (step 815). If the confidence threshold is not satisfied, then additional authorization processing may be performed (step 823). If, however, the confidence threshold is satisfied, then an authorization request message may then be forwarded onto issuer A 428(*a*) (step 816).

The transaction confidence threshold may take any number of transaction characteristics to score the transaction as being authentic or potentially suspicious. Such transaction characteristics may relate to the access device (e.g., whether the access device uses new or old technology, whether the access device uses a secure encryption algorithm to encrypt data, etc.), portable consumer device (e.g., whether the portable consumer device is a phone, a magnetic stripe card with old technology, a magnetic stripe card with new technology, etc.), etc.

As noted above, in a payment processing system, there can be many different combinations of access devices and portable consumer devices interacting together at any given time. These different combinations of access devices and potable consumer devices may initiate transactions that may have different levels of potential authenticity. For example, referring to FIG. 10(*a*), access device A 734(*a*) may use an encryption algorithm from company A to encrypt data in an authorization request message, access device B 734(*b*) may use an encryption algorithm from company B, and access device C 734(*c*) may not use any encryption technology. Encryption algorithm A may be considered a more reliable encryption algorithm than encryption algorithm B. Consequently, authorization request messages from access device A 734(*a*) may have a higher level of potential authenticity than authorization request messages from access device B 734(*b*) or access device C 734(*c*). Additional authentication processing may be performed when transactions are performed by access devices B and C 734(*b*), 734(*c*) rather than the access device A 734(*a*). In another example, if portable consumer devices A, B, and C 732(*a*), 732(*b*), 732(*c*) are all highly secure portable consumer devices, then only authorization request messages coming from access device C 734(*c*) may be require additional authentication processing, since only the access device C 734(*c*) does not contain an encryption algorithm. As illustrated by this example, the threshold for determining whether or not additional authorization processing needs to be performed can be varied and can be set according to predetermined rules.

After the authorization request message is received by issuer A 728(*a*), issuer A may then determine if the transaction is authorized. If the transaction is not authorized (e.g., due to insufficient funds or credit in consumer A's account), then additional authorization processing may be performed and/or an authorization response message indicating that the transaction is declined may be sent to consumer A 730(*a*) (step 824).

If the transaction is approved by issuer A 728(*a*), then an authorization response message may be sent back to consumer A 730(*a*) via the payment processing network 726, acquirer A 724(*a*), merchant A 722(*a*), and access device A 734(*a*) (step 820).

At the end of the day, a normal clearing and settlement process can be conducted by the payment processing network 726. A clearing process is a process of exchanging financial details between an acquirer and an issuer to facilitate posting to a consumer's account and reconciliation of the consumer's settlement position. Clearing and settlement can occur simultaneously.

Further details regarding embodiments that use the methods and systems that are described above can be found in U.S. patent application Ser. No. 11/764,361, entitled Portable Consumer Device Verification System and Method, filed on Jun. 18, 2007 which is herein incorporated by reference in its entirety for all purposes.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    receiving, by a server computer from an access device, a first authorization request message generated by the access device for a transaction between a merchant and a consumer, the first authorization request message including first dynamic data generated by a portable consumer device used by the consumer;
    authenticating, by the server computer, the portable consumer device by using the first dynamic data received in the first authorization request message;
    determining, by the server computer, that a series of features relating to the transaction, the consumer, and the merchant exceed a predetermined range;
    retrieving, by the server computer, a challenge message from a database, wherein the challenge message is dynamic, and wherein the challenge message is a challenge question;
    sending, by the server computer, the challenge message comprising the challenge question to the access device in a first authorization response message;
    receiving, by the server computer from the access device, a second authorization request message comprising an account number associated with the portable consumer device, and a challenge response from the consumer;
    validating, by the server computer, the received challenge response by comparing the challenge response to information stored in the database; and
    in response to validating the received challenge response, initiating approval of the transaction.

2. The method of claim 1 wherein initiating approval of the transaction comprises transmitting the second authorization request message to an issuer computer associated with the portable consumer device, and wherein the portable consumer device is a card.

3. The method of claim 2 wherein the method further comprises:
    transmitting, by the server computer, the challenge response to the issuer computer as part of the second authorization request message.

4. The method of claim 3 further comprising:
    linking, by the server computer, the second authorization request message to the first authorization request message for the transaction by a transaction code.

5. The method of claim 1 wherein the first dynamic data is generated from one or more of transaction-specific data and consumer-specific data that include one or more of: a terminal ID, a telephone number, a SIM card number, the account number, a service code, an expiration date, and/or data regarding a prior transaction.

6. The method of claim 1 further comprising:
    performing, by the server computer, additional authentication processing when a transaction amount for the transaction is greater than a predetermined dollar limit.

7. The method of claim 1 further comprising:
    performing, by the server computer, additional authentication processing for the transaction based on an analysis of a geographic location of the transaction.

8. The method of claim 1 wherein the challenge question requests data regarding a physical location of the portable consumer device.

9. The method of claim 1, wherein the method further comprises:
    generating, by the server computer, the first authorization response message including the challenge message, and wherein sending the challenge message to the access deivce comprises
    transmitting, by the server computer, the first authorization response message with the challenge message to the access device.

10. The method of claim 1 wherein the challenge message is dynamically generated, by the server computer, using real-time information regarding the consumer and a transaction history of the consumer stored in the database.

11. The method of claim 1 further comprising:
performing, by the server computer, a real-time risk analysis on the transaction.

12. The method of claim 1 wherein the portable consumer device is a mobile phone.

13. The method of claim 1 further comprising:
retrieving, by the server computer, data for the challenge message from an external server computer; and
storing, by the server computer, the data for the challenge message in the database.

14. The method of claim 1 further comprising:
determining, by the server computer, a merchant category associated with the merchant; and
determining, by the server computer, a number of challenge messages to retrieve for the transaction based on parameters provided by the consumer for the merchant category.

15. The method of claim 1 further comprising:
receiving, by the server computer from the portable consumer device, a geographic location for the portable consumer device.

16. The method of claim 6 wherein performing additional authentication processing for the transaction further comprises:
sending, by the server computer, a notification message for the transaction to the portable consumer device.

17. A server computer comprising:
a non-transitory computer readable medium having instructions stored thereon that, when executed, cause a computer to perform steps including:
receiving, by the server computer from an access device, a first authorization request message generated by the access device for a transaction between a merchant and a consumer, the first authorization request message including first dynamic data generated by a portable consumer device used by the consumer;
authenticating, by the server computer, the portable consumer device by using the first dynamic data received in the first authorization request message, wherein the first dynamic data is different for each transaction and is generated from one or more of transaction-specific data and/or consumer-specific data;
determining, by the server computer, that a series of features relating to the transaction, the consumer, and the merchant exceed a predetermined range;
retrieving, by the server computer, a challenge message from a database, wherein the challenge message is dynamic, and wherein the challenge message is a challenge question;
sending, by the server computer, the challenge message to the access device in a first authorization response message;
receiving, by the server computer from the access device, a second authorization request message comprising an account number associated with the portable consumer device, and a challenge response from the consumer;
validating, by the server computer, the received challenge response by comparing the challenge response to information stored in the database; and
in response to validating the received challenge response, initiating approval of the transaction.

18. A system comprising:
a server computer comprising
a computer readable medium having instructions stored thereon that, when executed, cause a computer to perform steps including
receiving, from an access device, a first authorization request message generated by the access device for a transaction between a merchant and a consumer, the first authorization request message including first dynamic data generated by a portable consumer device used by the consumer;
authenticating the portable consumer device by using the first dynamic data received in the first authorization request message;
determining that a series of features relating to the transaction, the consumer, and the merchant exceed a predetermined range;
retrieving a challenge message from a database, wherein the challenge message is dynamic, and wherein the challenge message is a challenge question;
sending the challenge message comprising the challenge question to the access device in a first authorization response message;
receiving, from the access device, a second authorization request message comprising an account number associated with the portable consumer device, and a challenge response from the consumer;
validating the received challenge response by comparing the challenge response to information stored in the database; and
in response to validating the received challenge response, initiating approval of the transaction; and
the access device in communication with the server computer.

* * * * *